United States Patent
Kamada et al.

(10) Patent No.: US 7,028,340 B1
(45) Date of Patent: Apr. 11, 2006

(54) APPARATUS, A SYSTEM AND METHOD FOR CONTROLLING ACCESS TO CONTENTS

(75) Inventors: Jun Kamada, Kawasaki (JP); Seigo Kotani, Kawasaki (JP); Etsuo Ono, Kawasaki (JP); Massayuki Hatanaka, Kawasaki (JP); Masatoshi Yoshida, Kawasaki (JP); Takahiro Nakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 697 days.

(21) Appl. No.: 09/628,562

(22) Filed: Jul. 28, 2000

(30) Foreign Application Priority Data

Sep. 17, 1999 (JP) ................................ 11-264616

(51) Int. Cl.
  G06F 17/30 (2006.01)
  G06F 7/04 (2006.01)
  G06K 9/00 (2006.01)
  H03M 1/68 (2006.01)
  H04K 1/00 (2006.01)

(52) U.S. Cl. ......................................... 726/29; 705/59
(58) Field of Classification Search ................ 713/169, 713/179, 192, 166; 380/201; 705/51, 59; 726/29
See application file for complete search history.

(56) References Cited

U.S. PATENT DOCUMENTS

| | | | | |
|---|---|---|---|---|
| 5,052,040 A | * | 9/1991 | Preston et al. .............. | 713/165 |
| 5,646,999 A | * | 7/1997 | Saito ........................... | 705/54 |
| 5,696,827 A | * | 12/1997 | Brands ........................ | 380/30 |
| 5,949,877 A | * | 9/1999 | Traw et al. .................. | 713/171 |
| 6,188,995 B1 | * | 2/2001 | Garst et al. .................... | 705/59 |
| 6,327,652 B1 | * | 12/2001 | England et al. ................ | 713/2 |
| 6,330,670 B1 | * | 12/2001 | England et al. ................ | 713/2 |
| 6,445,795 B1 | * | 9/2002 | Sako et al. .................. | 380/201 |
| 6,477,649 B1 | * | 11/2002 | Kambayashi et al. ......... | 726/27 |
| 6,560,651 B1 | * | 5/2003 | Katz et al. .................. | 709/229 |
| 6,847,950 B1 | * | 1/2005 | Kamibayashi et al. ........ | 705/57 |

FOREIGN PATENT DOCUMENTS

| | | | |
|---|---|---|---|
| EP | 717338 A1 | * | 6/1996 |
| EP | 0923076 A1 | | 6/1999 |
| EP | 923076 A1 | * | 6/1999 |
| JP | HEI 11-099482 | | 4/1999 |
| WO | WO 98/42098 | | 9/1998 |

OTHER PUBLICATIONS

Beller, Michael J. et al, Privacy and Authentication on Portable Communication System, IEEE, 1991.*
Alfred J. Menezes, Paul C. van Oorschot, Scott A. Vanstone, "Handbook of Applied Cryptography", 1997, CRC Press, pp. 386-387.*

(Continued)

Primary Examiner—Gregory Morse
Assistant Examiner—Michael J. Simitoski
(74) Attorney, Agent, or Firm—Staas & Halsey LLP

(57) ABSTRACT

The apparatus controls access to the contents. The apparatus comprises MO device, MPEG2 decoder, and MO media as physical elements. Information for identifying these physical elements (identifying information) is allocated to each of these physical elements. License information, indicating whether access to the contents is to be allowed or not, is recorded on a MO media. Access to the contents recorded on the MO media is controlled based on the license information and the identifying information.

9 Claims, 27 Drawing Sheets

OTHER PUBLICATIONS

B. Schneier, "Applied Cryptography, Combining Block Ciphers," Applied Cryptography. Protocols, Algorithms, And Source Code in C., XP002928034, 1996, pp. 357-368.

EP Search Report for related Application No. 00 306 737.8 dated Dec. 17, 2004.

* cited by examiner

FIG.8A
{ "MO MEDIA : MSN=123" , { "MO DEVICE : DSN=456" , { "MPEG2 DECODER : DSN=789" } K3} K2} K1

FIG.8B
"MO MEDIA : MSN=123" , { "MO DEVICE : DSN=456" , { "MPEG2 DECODER : DSN=789" } K3} K2

FIG.8C
{ "MO DEVICE : DSN=456" , { "MPEG2 DECODER : DSN=789" } K3} K2

FIG.8D
"MO DEVICE : DSN=456" , { "MPEG2 DECODER : DSN=789" } K3

FIG.8E
{ "MPEG2 DECODER : DSN=789" } K3

FIG.8F
"MPEG2 DECODER : DSN=789"

FIG.12A
{"MO MEDIA : MSN=123" , {"MO DEVICE : DSN=456" , {"MPEG2 DECODER : DSN=789" ,Kc} K3} K2} K1

FIG.12B
"MO MEDIA : MSN=123" , {"MO DEVICE : DSN=456" , {"MPEG2 DECODER : DSN=789" ,Kc} K3} K2

FIG.12C
{"MO DEVICE : DSN=456" , {"MPEG2 DECODER : DSN=789" ,Kc} K3} K2

FIG.12D
"MO DEVICE : DSN=456" , {"MPEG2 DECODER : DSN=789" ,Kc} K3

FIG.12E
{"MPEG2 DECODER : DSN=789" ,Kc} K3

FIG.12F
"MPEG2 DECODER : DSN=789" ,Kc

APPARATUS, A SYSTEM AND METHOD FOR CONTROLLING ACCESS TO CONTENTS

FIELD OF THE INVENTION

The present invention relates to a contents access control apparatus which controls access to contents provided by an authenticated information provider such as a copyright holder. This invention also relates to a contents access control system, method and a computer-readable recording medium where a contents access control program is recorded.

BACKGROUND OF THE INVENTION

Under present circumstances where distribution of contents such as digitized movies and music has started in earnest, it is urgently required to realize a mechanism to manage copyrights and licenses concerning this type of contents.

One can not sell or transfer contents such as movies or music (that is, material that has a copyright) in order to make profit unless the contents are licensed by the copyright holder ever since the Copyright Act was enacted. The contents here means digital contents that have such a structure as a collection of bit arrays recordable on a single piece of recording media, such as documents, still images, video, and software programs.

This type of contents is distributed to users in a state where the contents are recorded on recording media. In this case, controls for access to the contents (henceforth, contents access control) are provided using license information for the purpose of protection of their copyrights. This contents access control is provided in order that only an authorized user can get access to the contents.

As an example of contents access control, there is one realized by using license information consisting of identifying information that identifies each of physical elements (that is, system elements such as recording media, device) required for accessing the contents. This license information includes license conditions for the access to contents. Such a system has identifying information allocated specifically to that system. A user gets the license information from a channel different from a channel from where he gets the contents. The user then inputs the license information into the system, and sets the recording media, that contains the contents, into this system.

The system determines whether the identifying information allocated to he system satisfies the license conditions included in the license information entered by the user. When the information satisfies the license conditions, access to the content is allowed. On the other hand, when the information does not satisfy the license conditions, the access to the contents is not allowed.

As explained above, when accessing the contents in a conventional manner, it is required to acquire both the recording media that contains the contents and the license information from different channels, which is extremely inconvenient. Further, the recording media and the license information exist separately, which may cause either of the two to be lost in the conventional system.

Further, conventionally, only the license information exists as a single unit. Therefore, unauthorized duplication of the license information is possible, and as a result, there has been a problem that unauthorized access to the contents may occur. This is not good from the viewpoints of protection of copyright holders.

SUMMARY OF THE INVENTION

It is an object of this invention to provide a contents access control apparatus which allows a user to easily access the contents and which prevents unauthorized access to the contents, and also provide a contents access control system, method and a computer-readable recording medium that contains a contents access control program.

According to one aspect of this invention, the contents access control apparatus comprises a utilization unit which utilizes the contents and to which identifying information for identifying physical elements that comprise the utilization unit is allocated, the utilization unit includes a media on which the contents are recorded; and an access control unit which controls access to the contents based on the identifying information allocated to the utilization unit and a license information regarding the access to the contents, wherein the license information related to the contents is recorded on the media. Thus, the license information (information indicating whether access to the contents is to be allowed or not) and the contents are stored in one media in a correlated form. The access to the contents is controlled based on the license information and identifying information. Therefore, by acquiring the media, both the license information and the contents can concurrently be obtained. Resultantly, the contents can more easily be utilized as compared to the conventional case where the license information and the contents are acquired from different channels.

Further, the access control unit decrypts the blocked license information acquired from the media, and controls access to the contents based on these results of decryption and the identifying information. Only a user who has the right can decrypt all the blocked license information. Therefore, the case where the blocked license information can not be decrypted indicates the fact that the corresponding device belongs to an unauthorized user. As a consequence, unauthorized access to the contents can be prevented.

Further, the access control unit decrypts the blocked license information acquired from the media, and controls access to the contents based on these results of decryption and the identifying information. Only the user who has the right can decrypt all the blocked license information and the contents decryption key. Further, when the access is licensed by the access control unit, the utilization unit utilizes the contents based on the result of decrypting the contents using the contents decryption key. As a consequence, unauthorized access to the contents can be prevented.

Further, the access control unit controls access to the contents based on the result of decrypting the license information recorded on the secured region and the identifying information. Only a user who has the right can decrypt the license information. Therefore, the case where the license information can not be decrypted indicates the fact that the corresponding device belongs to an unauthorized user. As a consequence, unauthorized access to the contents can be prevented.

Further, the utilization unit comprises at least two physical elements and these two physical elements perform mutual authentication when a mutual authentication command is issued. When the two elements are mutually authenticated, the access control unit acquires license information from the specific region, and controls access to contents based on the license information and the identifying information. When these two are not mutually authenticated, on the other hand, the access is not licensed. Thus, the license can be disapproved at the instant at which it is determined that mutual authentication is not obtained. As a consequence, unauthorized access to the contents can be prevented.

Further, the secured region is mapped to the specific region, both of which are effective in security. Therefore, extremely high security can be ensured.

The invention according to another aspect comprises a read unit which reads out contents and license information from a media where the contents to be provided from an authenticated information provider to a user and the license information regarding access to the contents are recorded in correlation with each other; a transfer unit which transfers the read-out contents and license information as a file; a reception unit which receives the file; and a write unit which generates the contents and the license information from the file received by the reception unit, and writes the generated contents and license information onto another media. When contents and license information are read out from the media by the read unit, the contents and the license information are transferred as a file by the transfer unit. The contents and the license information are generated from the file by the reception unit. The write unit writes the contents and the license information in another media. Thus, the contents and the license information are transferred (copied) from one of media to the other media. Therefore, the license regarding the access to the contents can be transferred to a third party.

Other objects and features of this invention will become apparent from the following description with reference to the accompanying drawings.

BRIEF DESCRIPTION OF THE DRAWINGS

FIG. 8A to FIG. 8F show examples of the license information 242 shown in FIG. 5.

FIG. 12A to FIG. 12F show examples of the license information 300 shown in FIG. 10.

DESCRIPTION OF THE PREFERRED EMBODIMENTS

Seven preferred embodiments of the contents access control apparatus, the contents access control system, the contents access control method and the computer-readable recording medium containing a contents access control program according to this invention are explained in detail below with reference to the drawings.

Figure 1:
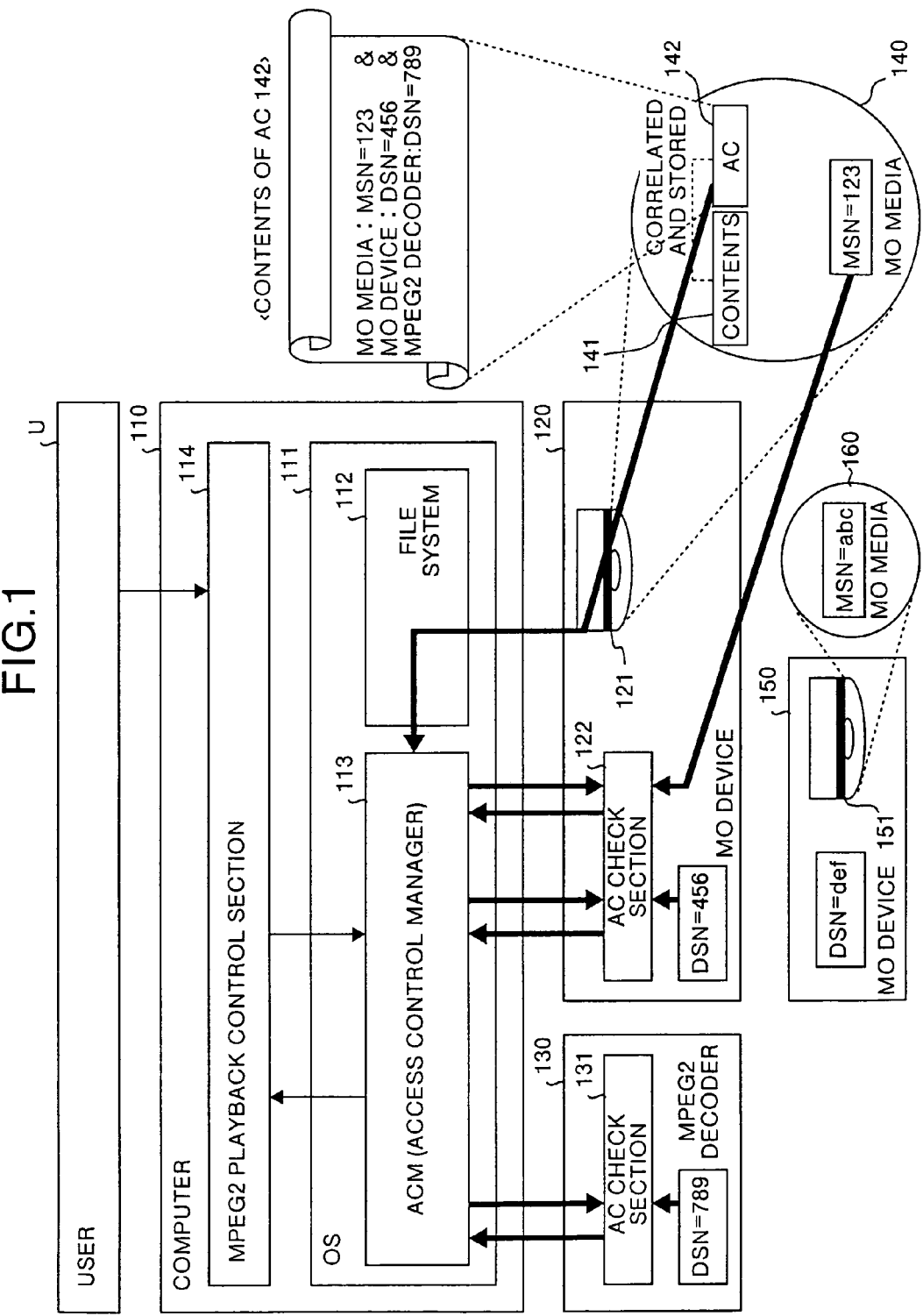
FIG. 1 is a block diagram showing the configuration of the first embodiment of this invention.

FIG. 1 is a block diagram showing a configuration of a first embodiment of this invention. A user U operates a computer 110. The computer 110 comprises OS (Operating System) 111. The OS 111 controls execution of various programs in this computer 110. File system 112 manages files handled by the computer 110, and controls read/write of data. ACM (Access Control Manager) 113 manages controls for access between the ACM and each of the file system 112, MPEG2 (Moving Picture Experts Group 2) playback control section 114, MO (Magneto Optic) device 120, and MPEG2 decoder 130.

The MPEG2 playback control section 114 provides controls for supplying data for moving pictures (contents) to the MPEG2 decoder 130. In reality, the functions of the MPEG2 playback control section 114 are realized by executing an MPEG2 playback control application program. The MO device 120 is provided externally (or internally), and reads out data from a MO media (MO media 140 in FIG. 1).

Contents 141 and AC (Access Condition: Information representing access approval condition) 142 are stored on the MO media 140 in a correlated form. The contents 141 are data for MPEG2-format moving pictures, for example, and are provided by the information provider such as the copyright holder. The data format of the contents 141 is immaterial on condition that the data is regarding the copyright or the license. The AC 142 is license information regarding the playback of the contents 141. The playback of the contents 141 is allowed when the provided data satisfies the condition of the AC 142. Whereas, The playback of the contents 141 is not allowed when the data does not satisfy the conditions of the AC 142.

The condition of the AC 142 consists of a combination of respective identifying information allocated to a plurality of target physical elements. This target physical element includes any device and media, such as MO media, MO device, and MPEG2 device, that are required to playback the contents 141. Identifying information includes MSN (Media Serial Number) and a DSN (Device Serial Number). It will be assumed here that the AC 142 has the MSN of the MO media set to "123", the DSN of the MO device set to "456", and the DSN of the MPEG2 decoder set to "789". Further, the condition for a logical product (AND) MSN (=123) & DSN (=456) & DSN (=789) is set in the AC 142.

That is, according to the AC 142, the playback of the contents 141 can be licensed only when all of three conditions is satisfied: the MO media are ones to which the MSN (=123) is allocated, the MO device is one to which the DSN (=456) is allocated, and the MPEG2 decoder is one to which the DSN (=789) is allocated. Conversely, playback of the contents 141 is not allowed when one or two conditions out of the three conditions are not satisfied. Thus, the AC 142 plays a role as a license to give approval of playback of the contents 141 only to an authorized party who can simultaneously satisfy the three conditions.

Figure 2:
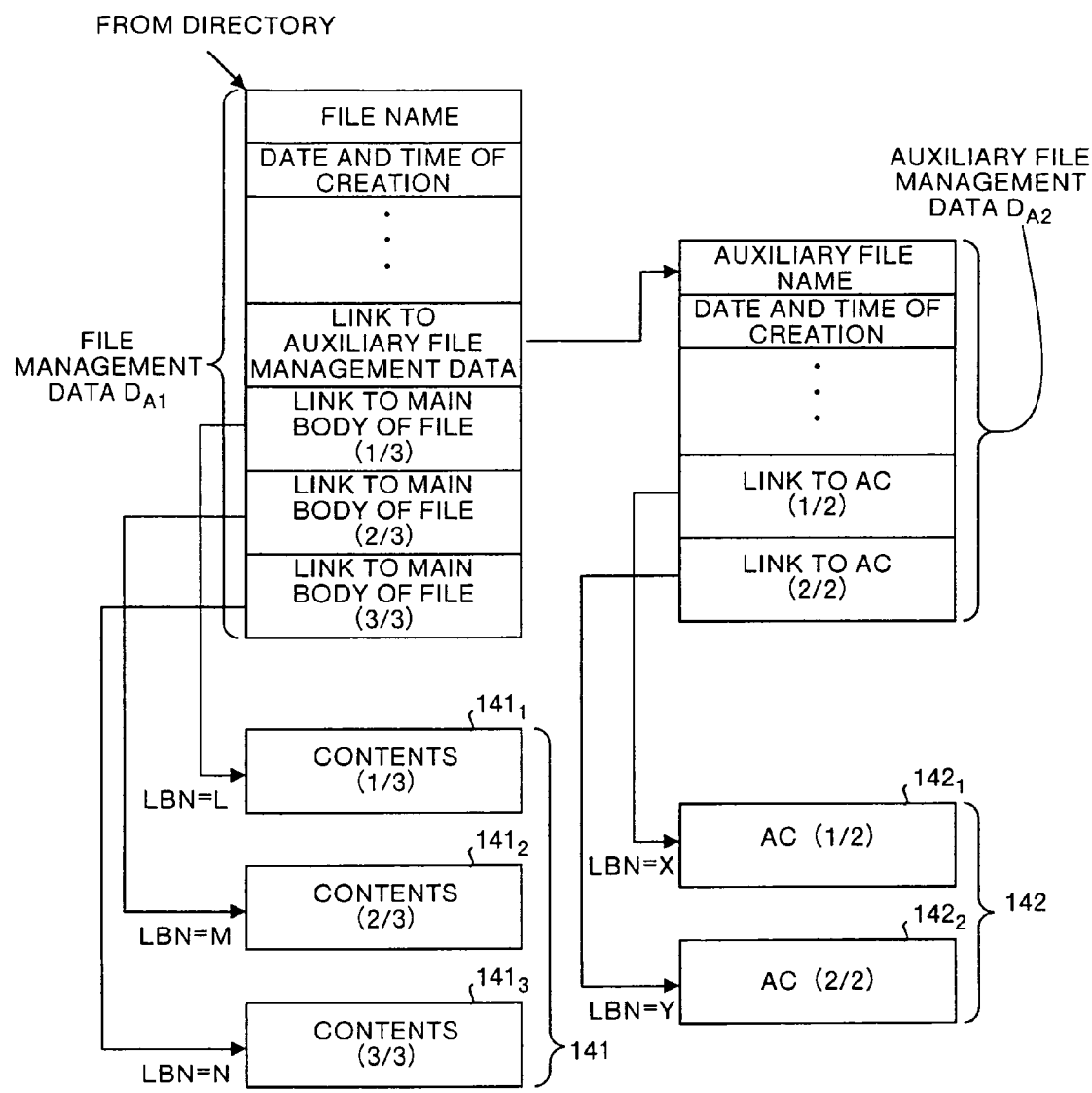
FIG. 2 is a diagram showing a relationship between the contents 141 and the AC 142 shown in FIG. 1.

The contents 141 and the AC 142 are stored on the MO media 140 in a correlated form as shown in FIG. 2. The contents 141 of the MO media 140 are divided into three blocks: contents (1/3) 141₁, contents (2/3) 141₂, and contents (3/3) 141₃. These contents (1/3) 141₁, contents (2/3) 141₂, contents (3/3) 141₃ are stored in regions specified by LBN (Logical Block Number)=L, LBN=M, and LBN=N, respectively.

Similarly, the AC 142 of the MO media 140 is divided into two blocks: AC (1/2) 142₁, and AC (2/2) 142₂. These AC (1/2) 142₁ and AC (2/2) 142₂ are stored in regions specified by LBN=X and LBN=Y, respectively.

The contents 141 and the AC 142 are correlated with each other via file management data $D_{A1}$ and auxiliary file management data $D_{A2}$. The file management data $D_{A1}$ is used for managing the contents 141 as the main body of the file and the AC 142 as an auxiliary file. This file management data $D_{A1}$ consists of information such as "file name", "date and time of creation", "link to the auxiliary file management data", "link to main body of the file (1/3)", "link to main body of the file (2/3)", and "linkage to main body of the file (3/3)".

On the other hand, the auxiliary file management data $D_{A2}$ is used for directly managing the AC 142, and consists of information such as "auxiliary file name", "date and time of creation", ..., "link to AC (1/2)", and "link to AC (2/2)".

Figure 3:
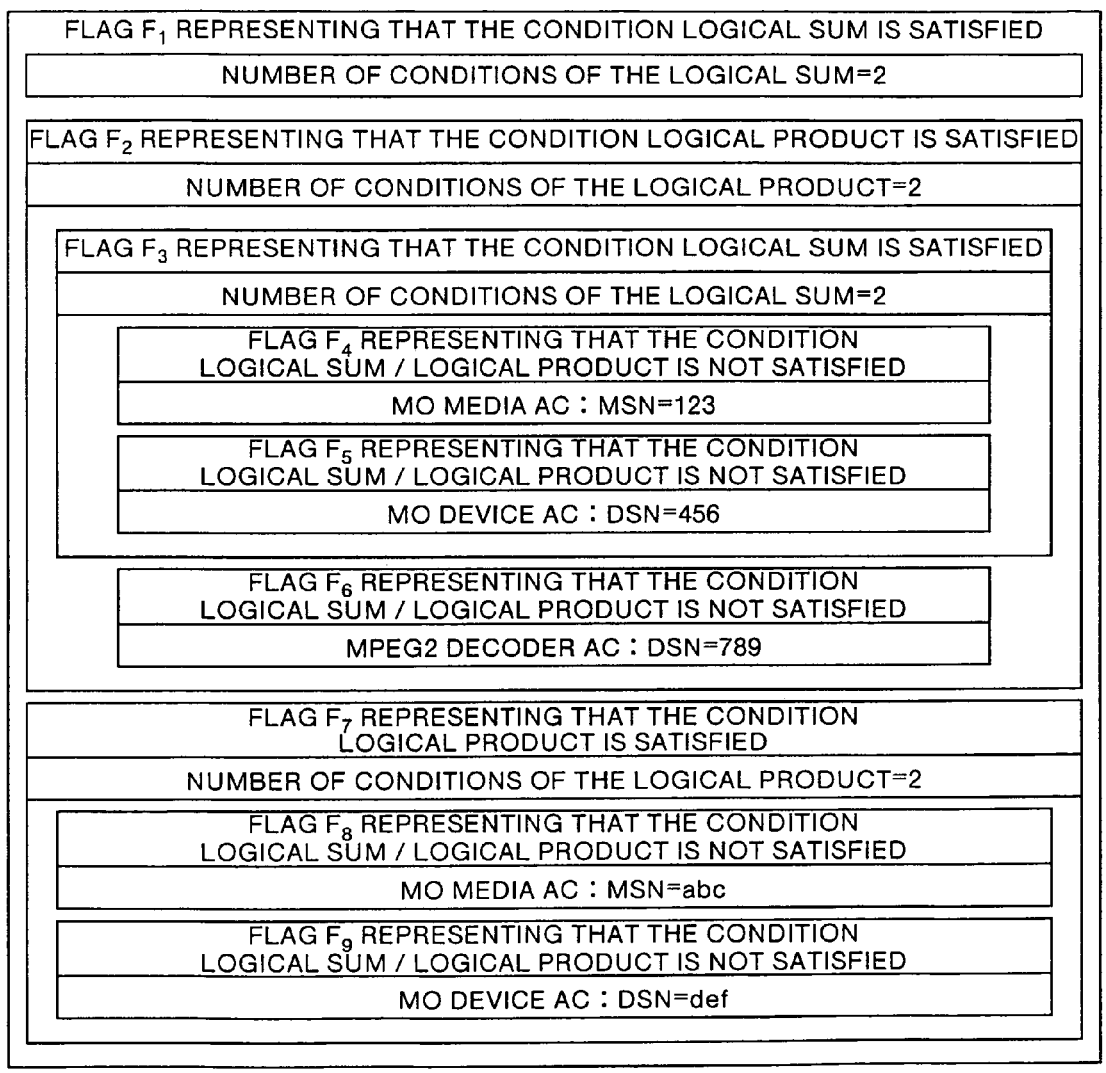
FIG. 3 is an example of the format of the AC 142 shown in FIG. 1.

FIG. 3 shows an example of the format of the AC 142. In this figure, flag $F_4$ represents the fact that the MO media AC: MSN=123 does not satisfy the condition for logical sum (OR)/logical product (AND). Flag $F_5$ represents the fact that the MO device AC: DSN=456 (see FIG. 1) does not satisfy the condition for logical sum/logical product (the slash / represents 'or'). Flag $F_3$ represents the fact that the MO media AC: MSN=123 and the MO device AC: DSN=456 satisfy the conditions of a logical sum. In this case, the number of conditions for a logical sum is 2.

Flag $F_6$ represents the fact that MPEG2 decoder AC: DSN=789 does not satisfy the condition for logical sum/logical product. Flag $F_2$ represents the fact that the elements with regard to flag $F_3$ (MSN=123, DSN=456) and the element with regard to flag $F_6$ (DSN=789) satisfy the conditions for the logical sum. In this case, the number of conditions for the logical sum is 2. Formats from the flag $F_2$ to the flag $F_6$ are used here for the AC 142 shown in FIG. 1. Thus, flag $F_1$ and flag $F_7$ to flag $F_9$ shown in FIG. 3 are used for extension.

Flag $F_8$ represents the fact that MO media AC: MSN=abc does not satisfy the condition for logical sum/logical product. Flag $F_9$ represents the fact that MO device AC: DSN=def does not satisfy the condition for logical sum/logical product. Flag $F_7$ represents the fact that the element (MSN=abc) with regard to flag $F_8$ and the element (DSN=def) with regard to flag $F_9$ satisfy the conditions for logical product. The number of conditions for the logical product in this case is 2. Flag $F_1$ represents the fact that the elements (MSN=123, DSN=456, DSN=789) with regard to flag $F_2$ and the elements (MSN=abc, DSN=def) with regard to flag $F_7$ satisfy the conditions for a logical sum. In this case, the number of conditions for the logical sum is 2.

Referring to FIG. 1, MSN=123 is allocated to the MO media 140 as media identifying information. DSN=456 is allocated to the MO device 120 as device identifying information. A drive 121 drives the MO media 140 so as to rotate the media at the time of reading out the data. AC check section 122 checks whether the MSN=123 read-out from the MO media 140 satisfies the condition (in this case, MSN=123) of the AC 142. Similarly, the AC check section 122 checks whether the DSN=456 allocated to the MO device 120 satisfies the condition (in this case, DSN=456) of the AC 142.

The MPEG2 decoder 130 decodes the contents 141 (for example, video data) based on the MPEG2 format and playbacks the contents 241. DSN=789 is allocated to this MPEG2 decoder 130 as device identifying information. The AC check section 131 checks whether the DSN=789 satisfies the condition (in this case, DSN=789) of the AC 142.

MO device 150 is provided separately from (may be provided together with) the MO device 120 and reads out data from a MO media (MO media 160 in FIG. 1). Drive 151 in this MO device 150 drives the MO media 160 so as to rotate. Further, DSN=def (see FIG. 3) is allocated to the MO device 150 as device identifying information. This DSN=def is different from the DSN=456 allocated to the MO device 120. MSN=abc is allocated to the MO media 160 as media identifying information. This MSN=abc is different from the MSN=123 allocated to the MO media 140.

Figure 4:
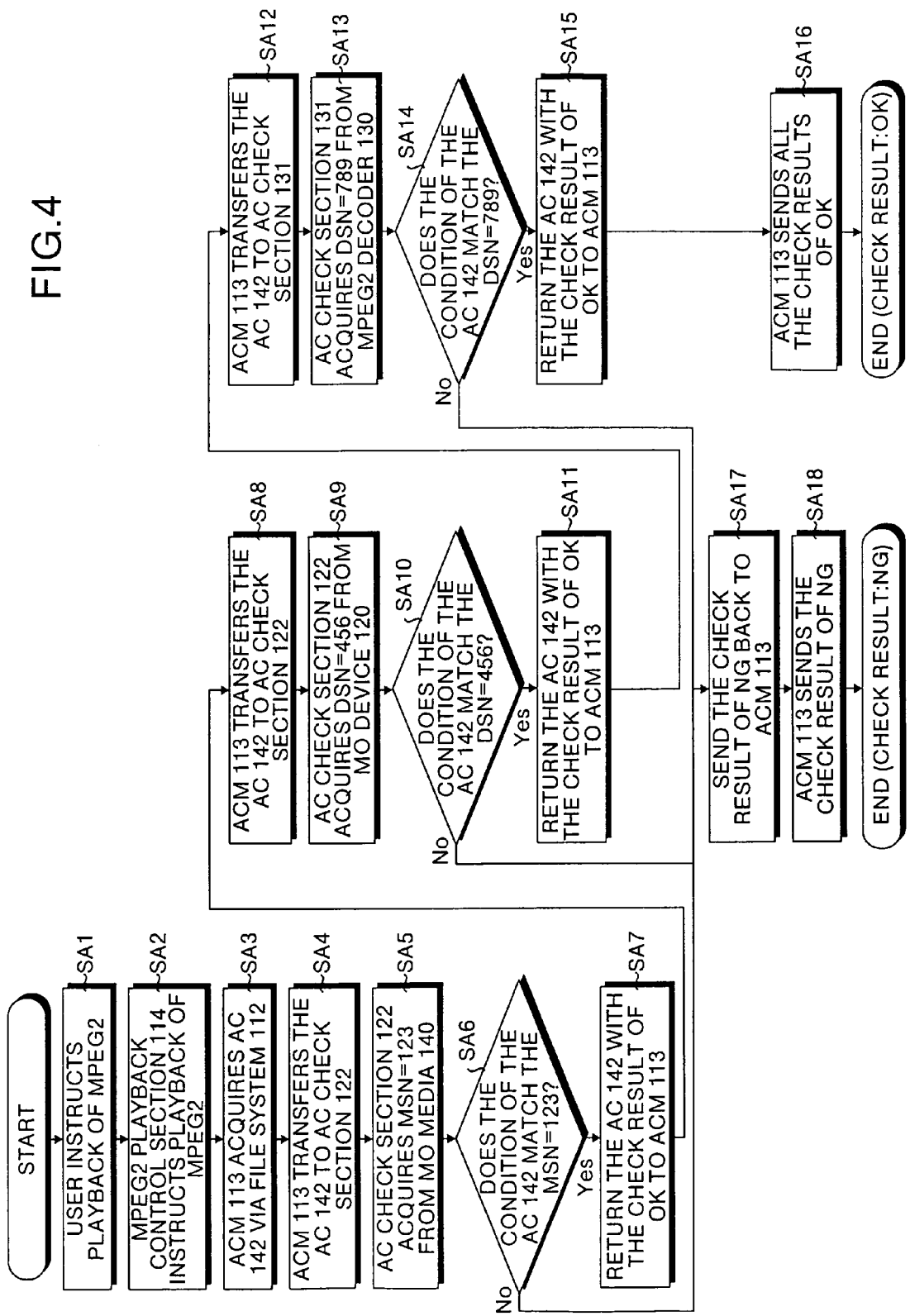
FIG. 4 is a flow chart showing the operation of the first embodiment.

Operation of the first embodiment will be explained below with reference to a flow chart shown in FIG. 4. It is assumed here that the MO media 140 is set in the drive 121 of the MO device 120. When the user U instructs playback of MPEG2 contents to the MPEG2 playback control section 114 at step SA1, at the next step SA2 the MPEG2 playback control section 114 instructs the playback of the MPEG2 contents to the ACM 113.

Accordingly, at step SA3, the ACM 113 acquires the AC 142 from the MO media 140 via the file system 112. At step SA4, the ACM 113 transfers the acquired AC 142 to the AC check section 122 of the MO device 120. At step SA5, the AC check section 122 then acquires the MSN (=123) from the MO media 140. At step SA6, the AC check section 122 determines whether the condition of the AC 142 matches the MSN (=123).

Precisely, the AC check section 122 determines whether the contents of the AC 142 (in this case, MO media: MSN=123) shown in FIG. 1 match the MSN (=123) acquired from the MO media 140. Assume that the two match. Therefore, the result of determination at step SA6 shall be "Yes".

On the other hand, when the result of determination at step SA6 is "No", namely when the two do not match, the processes in step SA17 is performed. At step SA17, the AC check section 122 sends the check result of NG (no match) back to the ACM 113. Accordingly, at step SA18, the ACM 113 sends the check result of NG back to the MPEG2 playback control section 114, and ends the series of processing. This case indicates that the condition of the AC 142

(MSN=123) is not satisfied, and hence the playback of the contents 141 recorded on the MO media 140 is not allowed.

When the result of determination at step SA6 is "Yes", at step SA7, the AC check section 122 returns the AC 142 together with the check result of OK (match) obtained at step SA6 to the ACM 113. Accordingly, at step SA8, the ACM 113 transfers the AC 142 to the AC check section 122. When receiving the AC 142, at step SA9, the AC check section 122 acquires DSN (=456) from the MO device 120. At step SA10, the AC check section 122 determines whether the condition of the AC 142 matches the DSN (=456).

Precisely, the AC check section 122 determines whether the contents of the AC 142 (in this case, MO device: DSN=456) shown in FIG. 1 match the DSN (=456) acquired from the MO device 120. Assume that the two match. Therefore, the result of determination at step SA10 will be "Yes".

On the other hand, when the result of determination at step SA10 is "No", the process at step SA17 is performed. At step SA17, the AC check section 122 sends the check result of NG back (no match) to the ACM 113. Accordingly, at step SA18, the ACM 113 sends the check result of NG back to the MPEG2 playback control section 114, and ends the series of processing. Thus, this case indicates that the conditions of the AC 142 (MSN=123 & DSN=456) are not satisfied, and hence the playback of the contents 141 recorded on the MO media 140 is not allowed.

When the result of determination at step SA10 is "Yes", at step SA11, the AC check section 122 returns the AC 142 together with the check result of OK (match) obtained at step SA10 to the ACM 113. Accordingly, at step SA12, the ACM 113 transfers the AC 142 to the AC check section 131 of the MPEG2 decoder 130. When receiving the AC 142, at step SA13, the AC check section 131 acquires DSN (=789) from the MPEG2 decoder 130. At step SA14, the AC check section 131 determines whether the condition of the AC 142 matches the DSN (=789).

Precisely, the AC check section 131 determines whether the contents of the AC 142 (in this case, MPEG2 decoder: DSN=789) shown in FIG. 1 match the DSN (=789) acquired from the MPEG2 decoder 130. Assume that the two match. Therefore, the result of determination at step SA14 will be "Yes".

On the other hand, when the result of determination at step SA14 is "No", the process at step SA17 is performed. At step SA17, the AC check section 131 sends the check result of NG (no match) back to the ACM 113. Accordingly, at step SA18, the ACM 113 sends the check result of NG back to the MPEG2 playback control section 114, and ends the series of processing. Thus, this case indicates that the conditions of the AC 142 (MSN=123 & DSN=456 & DSN=789) are not satisfied, and hence the playback of the contents 141 recorded on the MO media 140 is not allowed.

When the determination result at step SA14 is "Yes", at step SA15, the AC check section 131 returns the AC 142 together with the check result of OK (match) obtained at step SA14 to the ACM 113. Accordingly, at step SA16, the ACM 113 sends all the check results of OK obtained at step SA6, step SA10, and step SA14 back to the MPEG2 playback control section 114, and ends the series of processing. Thus, this case indicates that all the conditions of the AC 142 recorded on the MO media 140 are satisfied, and hence the playback of the contents 141 recorded on the MO media 140 is allowed.

Therefore, the MPEG2 playback control section 114 reads out the contents 141 from the MO media 140 via the drive 121 and the file system 112, and then transfers the contents to the MPEG2 decoder 130. Accordingly, the contents 141 are decoded and played as video by the MPEG2 decoder 130.

As explained above, according to the first embodiment, the AC 142 and the contents 141 are recorded in a correlated form on one MO media 140, and access to the contents 141 is controlled based on the AC 142 and the identifying information (MSN=123, and so on). Therefore, the AC 142 and the contents 141 can simultaneously be obtained when the MO media 140 is acquired. Thus, contents can more easily be utilized as compared to the conventional case where these two are acquired through different channels.

A case is explained in the first embodiment where the AC 142 is not encrypted. However, higher security may be achieved when the AC 142 is encrypted. This case is explained below as a second embodiment.

Figure 5:
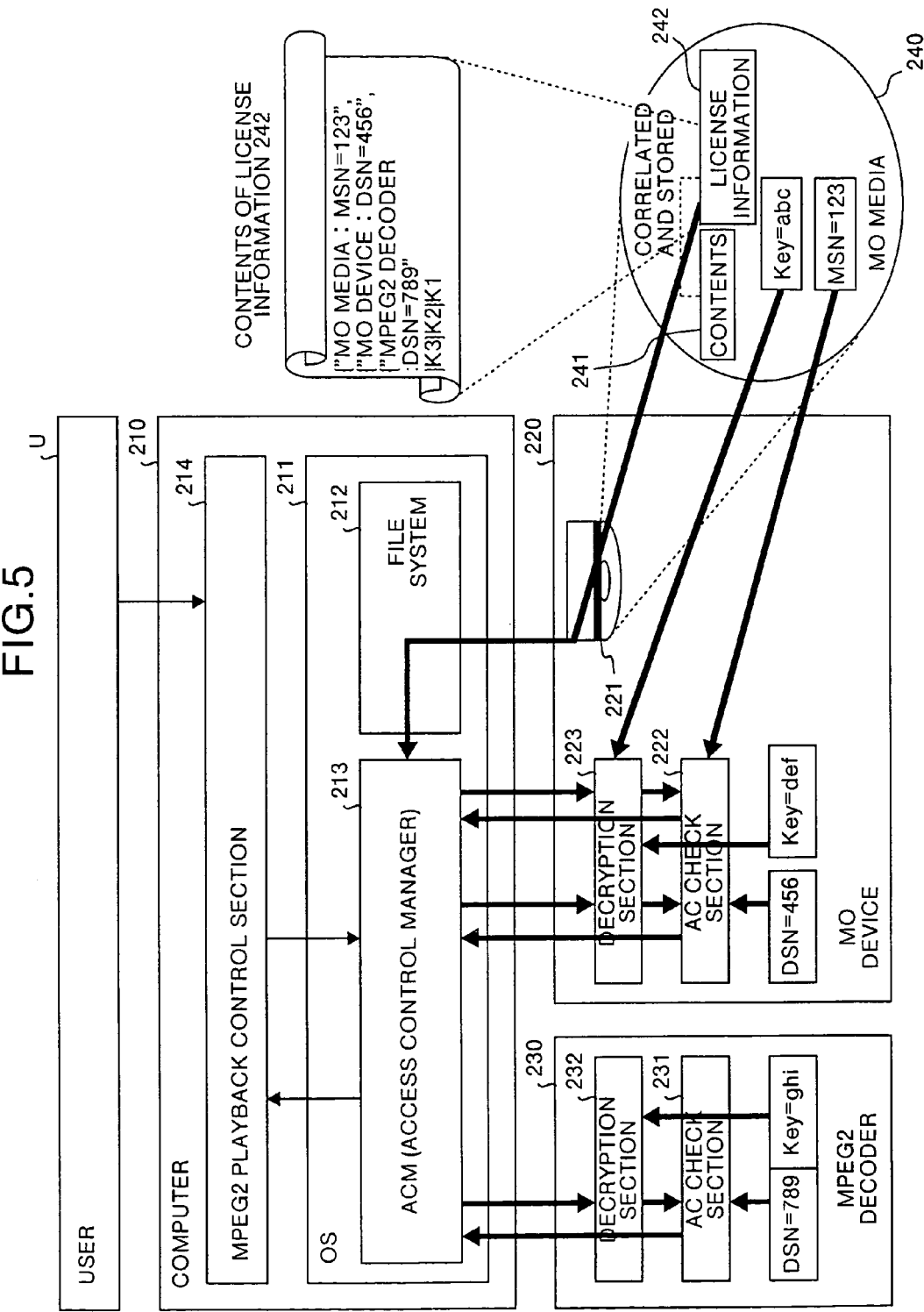
FIG. 5 is a block diagram showing the configuration of the second embodiment of this invention.

FIG. 5 is a block diagram showing a configuration of the second embodiment of this invention. The user U operates the computer 210. The computer 210 comprises OS 211. The OS 211 controls execution of various programs in this computer 210. File system 212 manages files handled by the computer 210, and controls read/write of data. ACM (Access Control Manager) 213 manages controls for access between the ACM and each of the file system 212, MPEG2 playback control section 214, MO device 220, and MPEG2 decoder 230.

The MPEG2 playback control section 214 has the same function as that of the MPEG2 playback control section 114 (see FIG. 1). The MO device 220 is provided externally (or internally), and reads out data from MO media (MO media 240 in FIG. 5).

Contents 241 and license information 242 are stored on the MO media 240 in a correlated form. The contents 141 are data for MPEG2-format moving pictures. The license information 242 is information regarding whether the playback of the contents 241 is allowed or not. That is, when provided data satisfies the conditions of the license information 242 then the playback of the contents 241 is allowed. Whereas, when the data does not satisfy the conditions of the license information 242, the playback of the contents 241 is not allowed. This license information 242 is obtained by performing multiple encryption on a plurality of information (MSN=123, DSN=456, and DSN=789) by a plurality of encryption keys. The detailed data structure of this license information 242 is explained later with reference to FIG. 7.

The condition of the license information 242 consists of a combination of respective identifying information allocated to a plurality of target physical elements. This target physical element includes any device and media, such MO media, MO device, and MPEG2 device, that are required to play back the contents 241. Identifying information includes MSN (Media Serial Number) and DSN (Device Serial Number). Precisely, the license information 242 has the MSN of the MO media set to "123", the DSN of the MO device set to "456", and the DSN of the MPEG2 decoder set to "789". Further, the condition for a logical product (AND): MSN (=123) & DSN (=456) & DSN (=789) is set in the license information 242.

That is, according to the license information 242, the playback of the contents 241 can be allowed only when all of three conditions is satisfied: the MO media are ones to which the MSN (=123) is allocated, the MO device is one to which the DSN (=456) is allocated, and the MPEG2 decoder is one to which the DSN (=789) is allocated. Conversely, when one or two conditions out of the three conditions are not satisfied, the playback of the contents 241 is not allowed. Thus, the license information 242 plays a role as a license to give approval of the playback of the contents 241 only to an authorized party who can simultaneously satisfy the three conditions.

Figure 6:
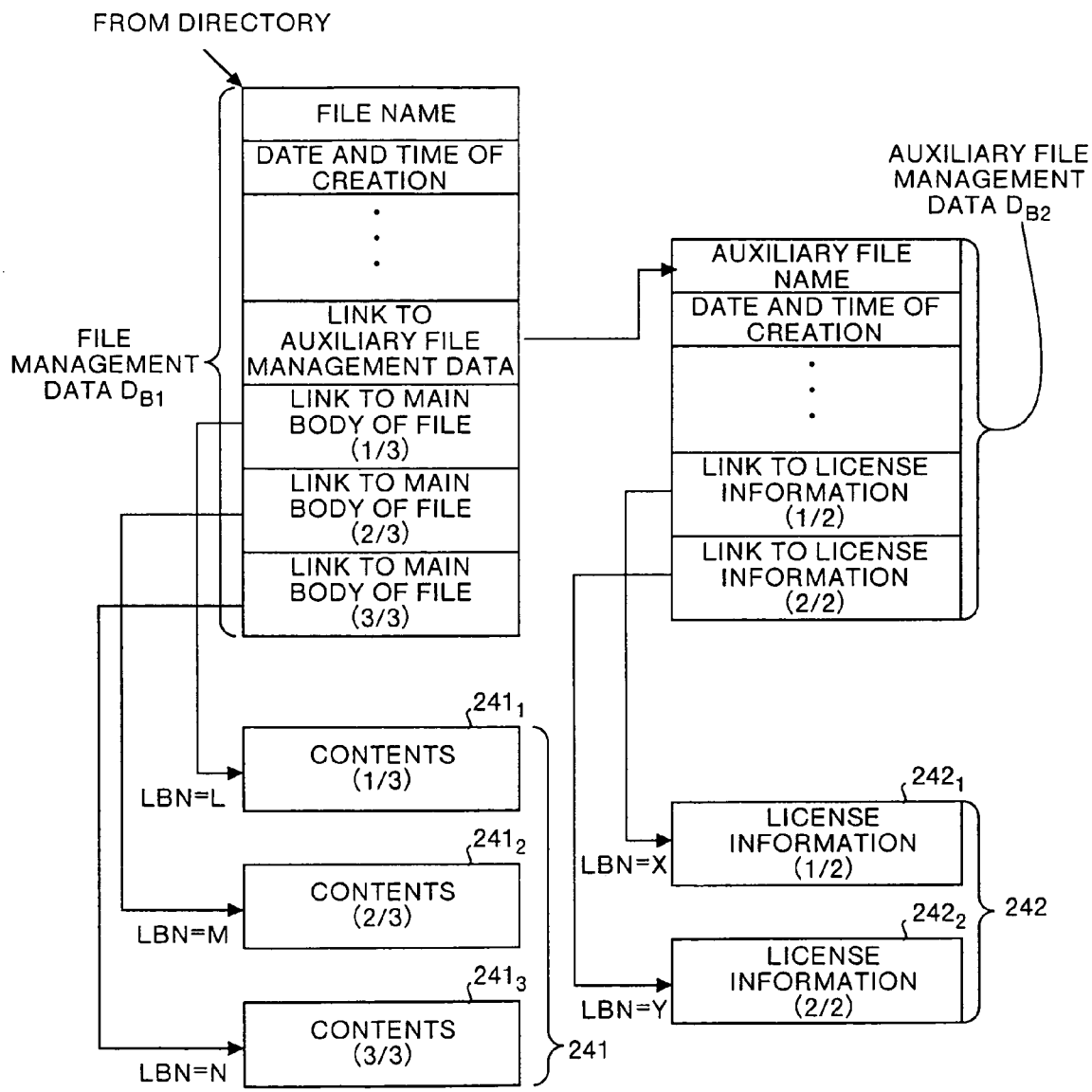
FIG. 6 is a diagram showing a shows a relationship between the contents 241 and the license information 242 shown in FIG. 5.

The contents 241 and the license information 242 are stored on the MO media 240 in a correlated form as shown in FIG. 6 in the same manner as that of FIG. 2. The contents 241 of the MO media 240 are divided into three blocks: contents (1/3) 241$_1$, contents (2/3) 241$_2$, and contents (3/3) 241$_3$. These contents (1/3) 241$_1$, contents (2/3) 241$_2$, contents (3/3) 241$_3$ are stored on regions specified by LBN=L, LBN=M, and LBN=N, respectively.

Similarly, the license information 242 of the MO media 240 is divided into two blocks: license information (1/2) 242$_1$, and license information (2/2) 242$_2$. These license information (1/2) 242$_1$ and license information (2/2) 242$_2$ are stored on regions specified by LBN=X and LBN=Y, respectively.

The contents 241 and the license information 242 are correlated with each other via file management data $D_{B1}$ and auxiliary file management data $D_{B2}$. The file management data $D_{B1}$ is used for managing the contents 241 as the main body of the file and the license information 242 as an auxiliary file. This file management data $D_{B1}$ consists of information such as "file name", . . . , "link to the main body of file (3/3)". On the other hand, the auxiliary file management data $D_{B2}$ is used for directly managing the license information 242, and consists of information such as "auxiliary file name", . . . , "link to the license information (1/2)", and "link to the license information (2/2)".

Referring to FIG. 5, MSN=123 is allocated to the MO media 240 as media identifying information. Key=abc is also stored on the MO media 240. This Key=abc is used for decrypting the MSN=123 from the license information 242. DSN=456 is allocated to the MO device 220 as device identifying information. Key=def is also stored in the MO device 220. This Key=def is used for decrypting the DSN=456 from the license information 242.

A drive 221 drives the MO media 240 so as to rotate the media at the time of reading out data. A decryption section 223 decrypts the MSN=123 from the license information 242 using the Key=abc stored on the MO media 240. Further, the decryption section 223 decrypts the DSN=456 from the license information 242 using the Key=def stored in the MO device 220.

AC check section 222 checks whether the MSN=123 read-out from the MO media 240 satisfies the condition (in this case, MSN=123) of the license information 242. The AC check section 222 also checks whether the DSN=456 allocated to the MO device 220 satisfies the condition (in this case, DSN=456) of the license information 242.

The MPEG2 decoder 230 decodes the contents 241 (data for moving pictures) in accordance with the MPEG2 format to playback the contents 241. DSN=789 is allocated to this MPEG2 decoder 230 as device identifying information. A decryption section 232 decrypts the DSN=789 from the license information 242 using Key=ghi stored in the MPEG2 decoder 230. AC check section 231 checks whether the DSN=789 satisfies the condition (in this case, DSN=789) of the license information 242.

Figure 7:
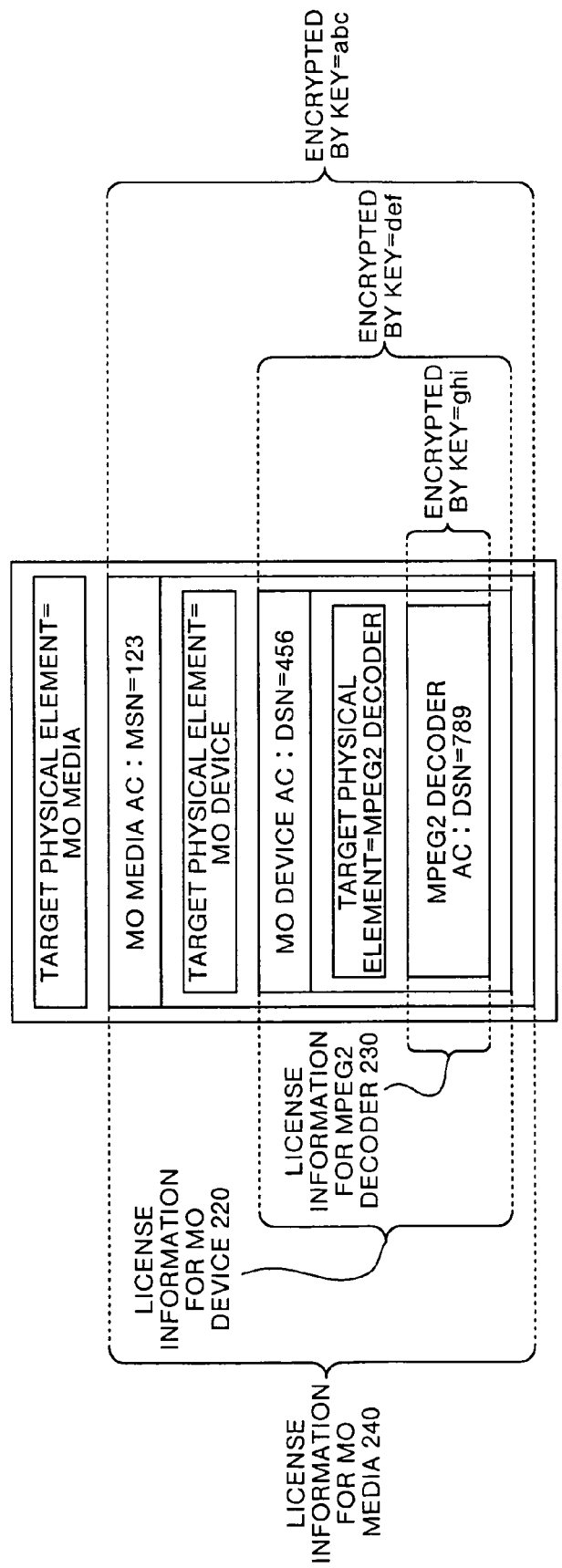
FIG. 7 shows an example of the format of the AC 242 shown in FIG. 5.

FIG. 7 shows an example of a license (license information 242) in the second embodiment. MPEG2 decoder AC: DSN=789 that corresponds to the MPEG2 decoder as the target physical element, is encrypted by the Key=ghi. Further, the DSN=789 is the license information for the MPEG2 decoder 230.

MO device AC: DSN=456 corresponds to the MO device as a target physical element. This DSN=456 and the encrypted DSN=789 are subjected to multiple encryption using the Key=def. These DSN=456 and DSN=789 subjected to multiple encryption are the license information for the MO device 220. Further, MO media AC: MSN=123 corresponds to the MO media as a target physical element. This MSN=123 and both of the DSN=456 and the DSN=789 subjected to multiple encryption are further subjected to multiple encryption using the Key=abc. These MSN=123, DSN=456, and DSN=789 subjected to multiple encryption are the license information for the MO media 240.

Figure 9:
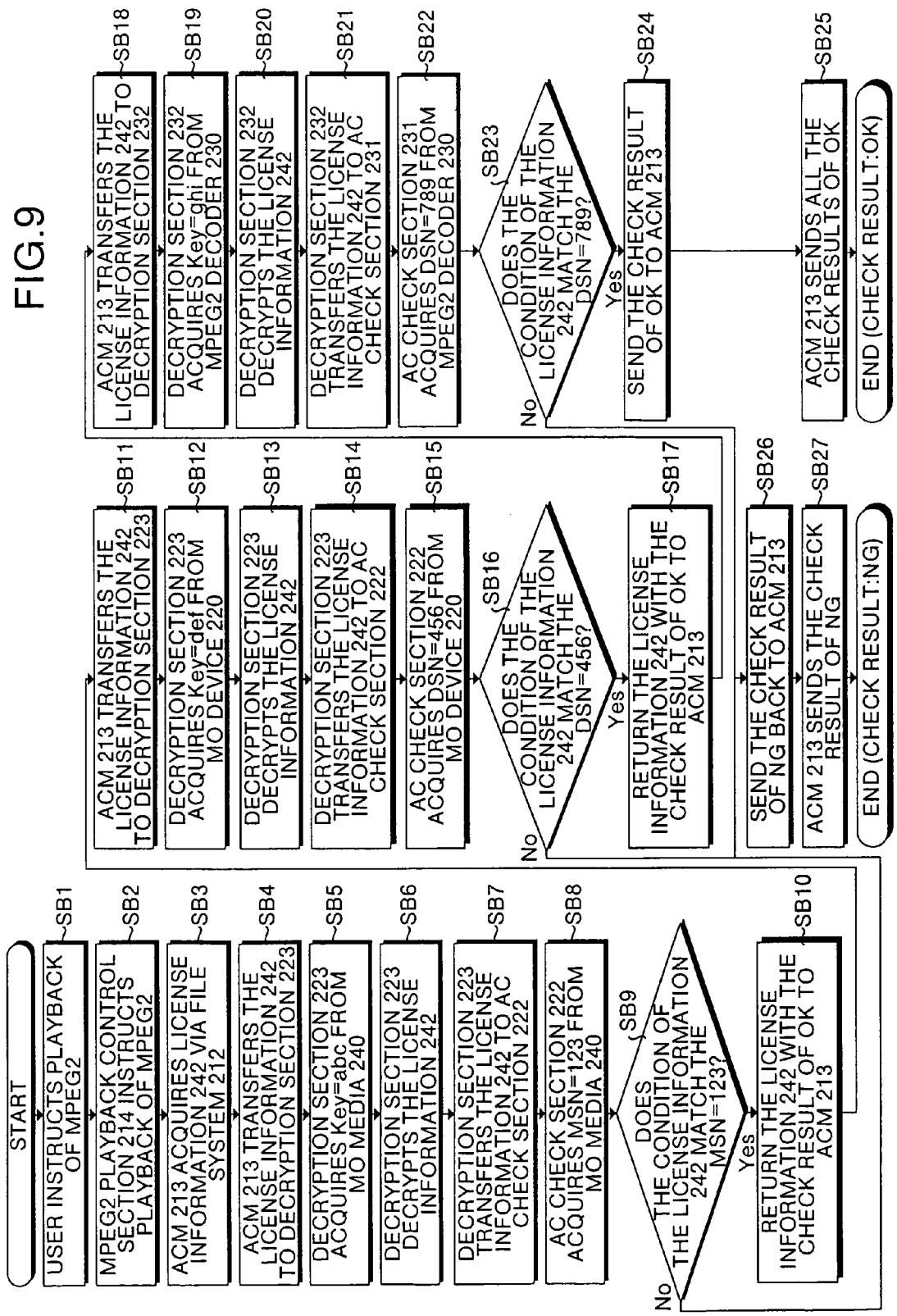
FIG. 9 is a flow chart showing the operation of the second embodiment.

Operation of the second embodiment will be explained below with reference to a flow chart shown in FIG. 9. It is assumed here that the MO media 240 is set in the drive 221 of the MO device 220. When the user U instructs playback of MPEG2 contents to the MPEG2 playback control section 214 at step SB1 as shown in FIG. 9, at step SB2, the MPEG2 playback control section 214 instructs the playback of the MPEG2 contents to the ACM 213.

At step SB3, the ACM 213 acquires the encrypted license information 242 shown in FIG. 8A from the MO media 240 via the file system 212. At step SB4, the ACM 213 transfers the acquired license information 242 to the decryption section 223 of the MO device 220. Accordingly, at step SB5, the decryption section 223 acquires a key (=abc=K1) from the MO media 240.

At step SB6, the decryption section 223 decrypts the license information 242 to that as shown in FIG. 8B using the key (=abc=K1). The MSN (=123) is decrypted here as shown in FIG. 8B. At step SB7, the decryption section 223 transfers the decrypted license information 242 to the AC check section 222.

At step SB8, the AC check section 222 acquires an MSN (=123) from the MO media 240. At step SB9, the AC check section 222 determines whether the condition (MSN=123) of the decrypted license information 242 shown in FIG. 8B matches the MSN (=123). Assume that the two match. Therefore, the result of determination at step SB9 will be "Yes".

On the other hand, when the result of determination at step SB9 is "No", the process at step SB26 is performed. At step SB26, the AC check section 222 sends the check result of NG (no match) back to the ACM 213. Accordingly, at step SB27, the ACM 213 sends the check result of NG back to the MPEG2 playback control section 214, and ends the series of processing. Thus, this case indicates that the condition for the license (MSN=123) based on the license information 242 is not satisfied, and hence the playback of the contents 241 recorded on the MO media 240 is not allowed.

When the result of determination at step SB9 is "Yes", at step SB10, the AC check section 222 returns the license information 242 shown in FIG. 8C together with the check result of OK obtained at step SB9 to the ACM 213. Accordingly, at step SB11, the ACM 213 transfers the received license information 242 to the decryption section 223 of the MO device 220. When receiving the license information 242, at step SB12, the decryption section 223 acquires a key (=def=K2) from the MO device 220.

At step SB13, the decryption section 223 decrypts the license information 242 to that as shown in FIG. 8D using the key (=def=K2). The DSN (=456) is decrypted here as shown in FIG. 8D. At step SB14, the decryption section 223 transfers the decrypted license information 242 to the AC check section 222.

At step SB15, the AC check section 222 acquires a DSN (=456) from the MO device 220. At step SB16, the AC check section 222 determines whether the condition (DSN=456) of the decrypted license information 242 matches the DSN (=456). Assume that the two match. Therefore, the result of determination at step SB16 will be "Yes".

On the other hand, when the result of determination at step SB16 is "No", the process at step SB26 is performed. At step SB26, the AC check section 222 sends the check result of NG back (no match) to the ACM 213. Accordingly, at step SB27, the ACM 213 sends the check result of NG back to the MPEG2 playback control section 214, and ends the series of processing. Thus, this case indicates that the conditions for the license (MSN=123 & DSN=456) based on the license information 242 are not satisfied, and hence the playback of the contents 241 recorded on the MO media 240 is not allowed.

When the result of determination at step SB16 is "Yes", at step SB17, the AC check section 222 returns the license information 242 shown in FIG. 8E together with the check result of OK (match) obtained at step SB16 to the ACM 213. At step SB18, the ACM 213 transfers the license information 242 to the decryption section 232 of the MPEG2 decoder 230. When receiving the license information 242, at step SB19, the decryption section 232 acquires a key (=ghi=K3) from the MPEG2 decoder 230.

At step SB20, the decryption section 232 decrypts the license information 242 to that as shown in FIG. 8F using the key (=ghi=K3). The DSN (=789) is decrypted here as shown in FIG. 8F. At step SB21, the decryption section 232 transfers the decrypted license information 242 to the AC check section 231.

At step SB22, the AC check section 231 acquires a DSN (=789) from the MPEG2 decoder 230. At step SB23, the AC check section 231 determines whether the condition (DSN=789) of the decrypted license information 242 matches the DSN (=789). Assume that the two match. Therefore, the result of determination at step SB23 will be "Yes".

On the other hand, when the result of determination at step SB23 is "No", the process at step SB26 is performed. At step SB26, the AC check section 231 sends the check result of NG back (no match) to the ACM 213. At step SB27, the ACM 213 sends the check result of NG back to the MPEG2 playback control section 214, and ends the series of processing. Thus, this case indicates that the conditions for the license (MSN=123 & DSN=456 & DSN=789) based on the license information 242 are not satisfied, and hence the playback of the contents 241 recorded on the MO media 240 is not allowed.

When the result of determination at step SB23 is "Yes", at step SB24, the AC check section 231 returns the check result of OK obtained at step SB23 to the ACM 213. At step SB25, the ACM 213 sends all the check results of OK (match) obtained at step SB9, step SB16, and step SB23 back to the MPEG2 playback control section 214, and ends the series of processing. Thus, this case indicates that all the conditions of the license information 242 recorded on the MO media 240 are satisfied, and hence the playback of the contents 241 recorded on the MO media 240 is licensed.

The MPEG2 playback control section 214 reads out the contents 241 from the MO media 240 via the drive 221 and the file system 212, and transfers the contents 241 to the MPEG2 decoder 230. The MPEG2 decoder 230 decodes the contents 241 and plays the video.

As explained above, according to the second embodiment, a plurality of blocked license information (MSN=123, DSN=456, and so on) are subjected to multiple encryption as shown in FIG. 7 to be recorded on the MO media 240. Thus, unauthorized access to the contents 241 can be prevented.

A case is explained in the second embodiment where the contents 241 is not encrypted. However, the contents 241 may also be encrypted. In this case, a contents decryption key to decrypt the encrypted contents 241 and the license information 242 may be subjected to multiple encryption. This case is explained below as a third embodiment.

Figure 10:
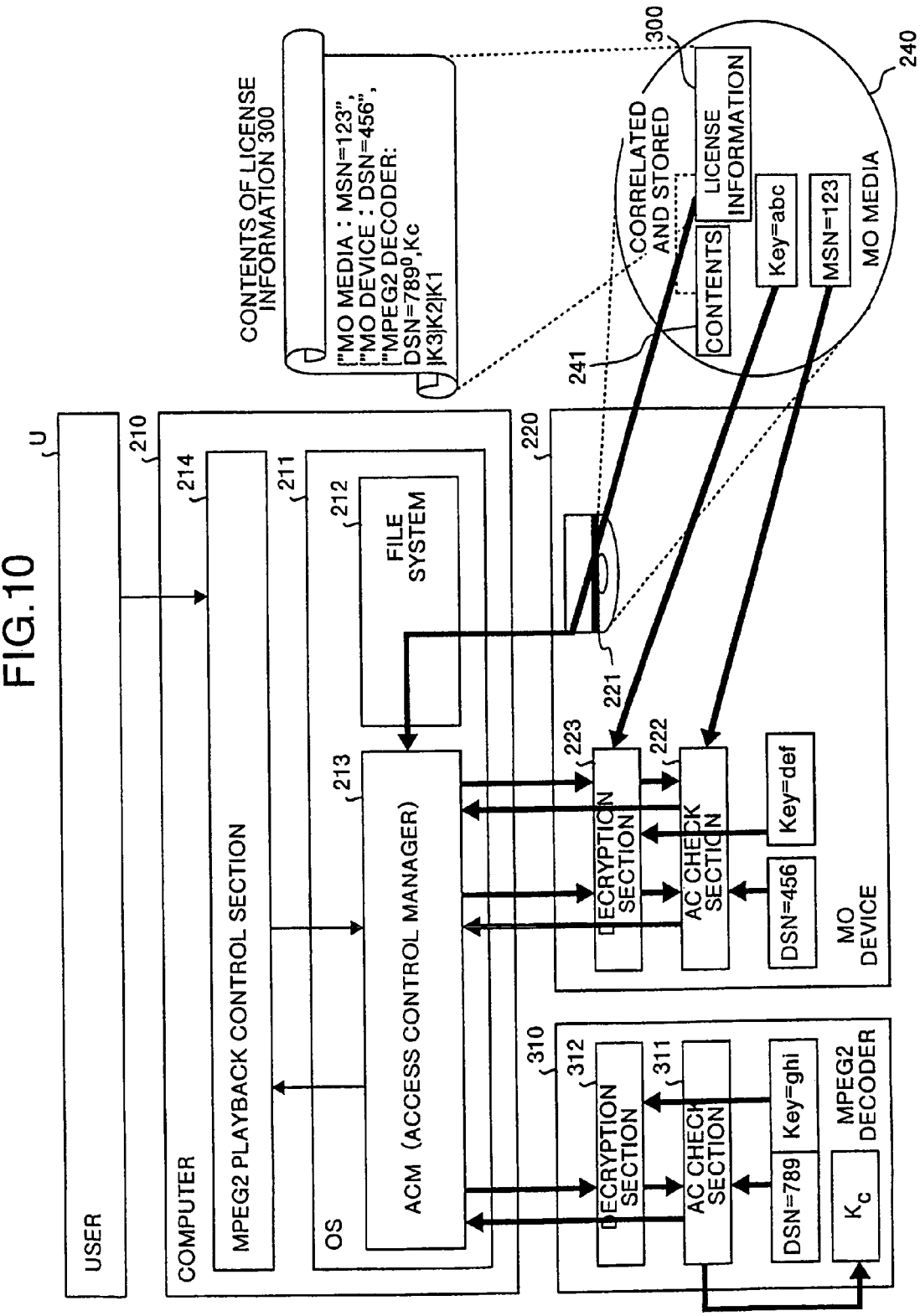
FIG. 10 is a block diagram showing the configuration of the third embodiment of this invention.

FIG. 10 is a block diagram showing a configuration of the third embodiment of this invention. Same legends are assigned in this figure to the sections that are similar to those in FIG. 5. MPEG2 decoder 310 is provided here instead of the MPEG2 decoder 230 shown in FIG. 5. Further, license information 300 is stored on the MO media 240 instead of the license information 242 shown in FIG. 5. The contents 241 shown in FIG. 10 is encrypted. These encrypted contents 241 and license information 300 are stored on the MO media 240 in a correlated form.

The MPEG2 decoder 310 decrypts the encrypted contents 241 (for example, video data) using a contents decryption key $K_c$ set by an AC check section 311, and decodes the result of this decryption to playback the contents 241. DSN=789 as device identifying information is allocated to this MPEG2 decoder 310. A decryption section 312 decrypts DSN=789 from the license information 300 using the Key=ghi stored in the MPEG2 decoder 310. The AC check section 311 checks whether the decrypted information satisfies the condition of the license information 300 (in this case, DSN=789).

Figure 11:
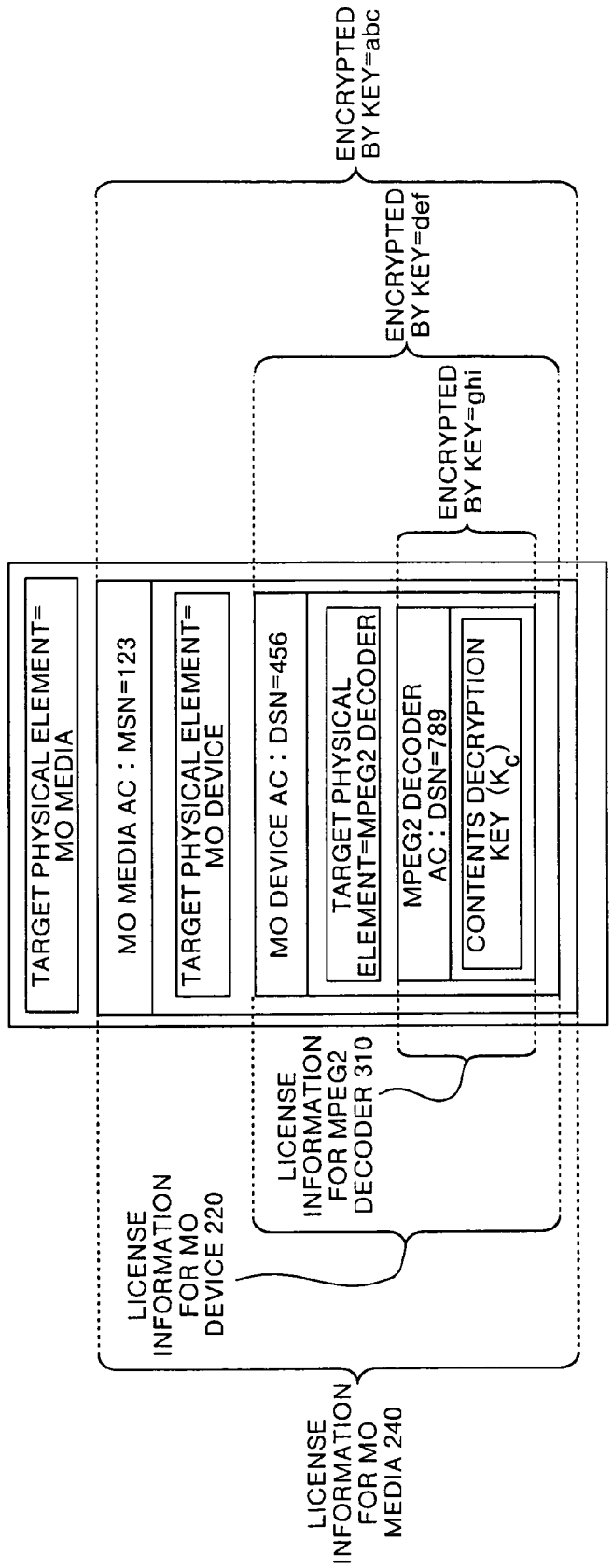
FIG. 11 shows an example of the license according to the third embodiment.

FIG. 11 shows an example of a license (license information 300) in the third embodiment. MPEG2 decoder AC: DSN=789 and contents decryption key $K_c$ correspond to the MPEG2 decoder as the target physical element, respectively, and are encrypted by the Key=ghi. This contents decryption key $K_c$ is used for decrypting the encrypted contents in the MPEG2 decoder 310. Further, the DSN=789 and the contents decryption key $K_c$ are license information for the MPEG2 decoder 310.

MO device AC: DSN=456 corresponds to the MO device as a target physical element. This DSN=456 and these encrypted DSN=789 and contents decryption key $K_c$ are further subjected to multiple encryption using the Key=def. These DSN=456, DSN=789, and contents decryption key $K_c$ subjected to multiple encryption are the license information for the MO device 220.

MO media AC: MSN=123 corresponds to the MO media as a target physical element. This MSN=123, and three of the DSN=456, the DSN=789, and the contents decryption key $K_c$ subjected to multiple encryption are further subjected to multiple encryption using the Key=abc. These MSN=123, DSN=456, DSN=789, and contents decryption key $K_c$ subjected to multiple encryption are the license information for the MO media 240.

Figure 13:
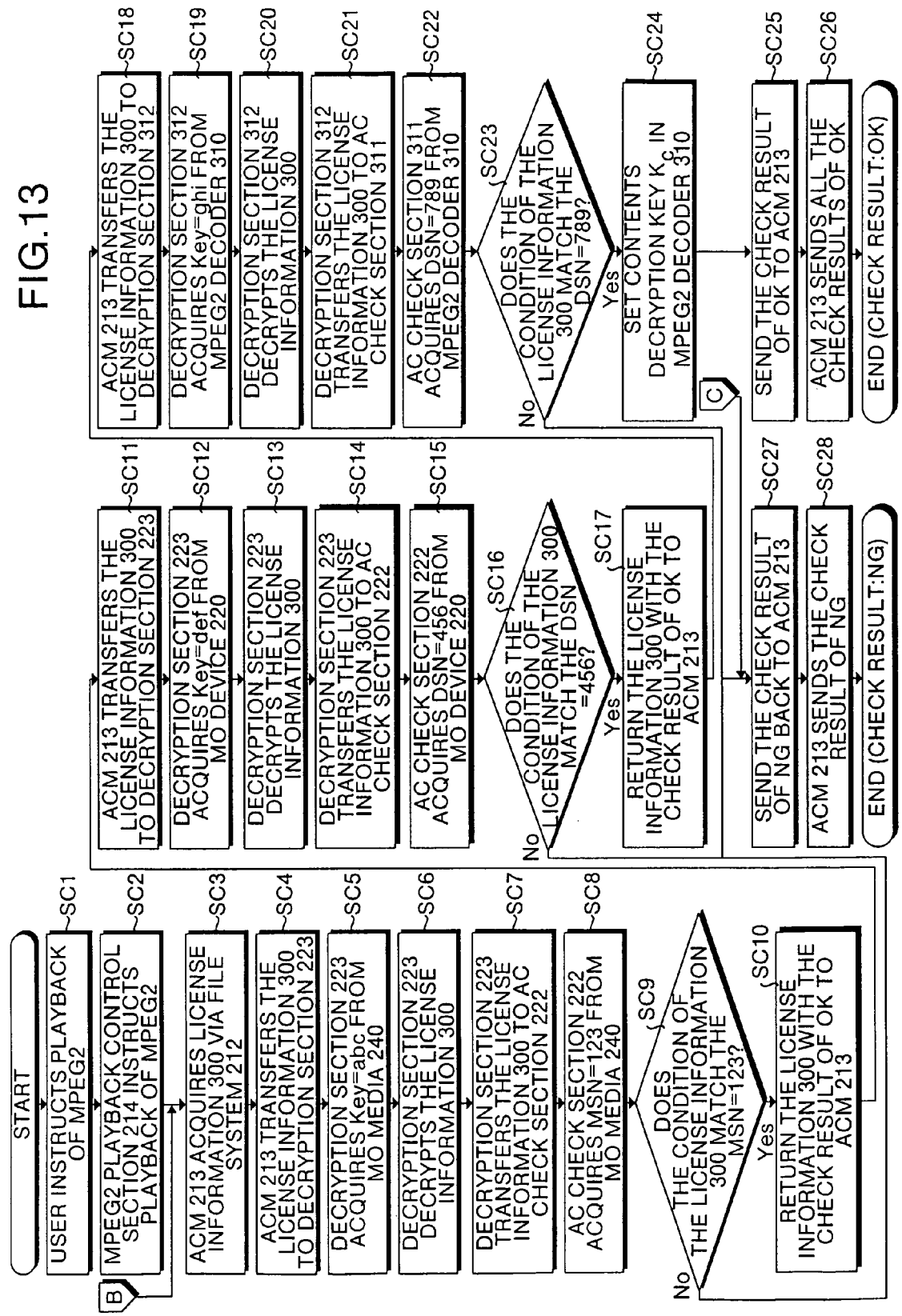
FIG. 13 is a flow chart showing the operation of the third embodiment.

Operation of the third embodiment will be explained below with reference to a flow chart shown in FIG. 13. In this case, it is assumed that the MO media 240 is set in the drive 221 of the MO device 220. When the user U instructs playback of MPEG2 contents to the MPEG2 playback control section 214 at step SC1 as shown in FIG. 13, at step SC2, the MPEG2 playback control section 214 instructs the playback of the MPEG2 contents to the ACM 213.

At step SC3, the ACM 213 acquires the encrypted license information 300 shown in FIG. 12A from the MO media 240 via the file system 212. At step SC4, the ACM 213 transfers the acquired license information 300 to the decryption section 223 of the MO device 220. At step SC5, the decryption section 223 acquires a key (=abc=K1) from the MO media 240.

At step SC6, the decryption section 223 decrypts the license information 300 to that as shown in FIG. 12B using the key (=abc=K1). The MSN (=123) is decrypted here as shown in FIG. 12B. At step SC7, the decryption section 223 transfers the decrypted license information 300 to the AC check section 222.

At step SC8, the AC check section 222 acquires an MSN (=123) from the MO media 240. At step SC9, the AC check section 222 determines whether the condition (MSN=123) of the decrypted license information 300 shown in FIG. 12B matches the MSN (=123). Assume that the two match. Therefore, the result of determination at step SC9 will be "Yes".

On the other hand, when the result of determination at step SC9 is "No", the process at step SC27 is performed. At step SC27, the AC check section 222 sends the check result of NG (no match) back to the ACM 213. Accordingly, at step SC28, the ACM 213 sends the check result of NG back to the MPEG2 playback control section 214, and ends the series of processing. Thus, this case indicates that the condition for the license (MSN=123) based on the license information 300 is not satisfied, and hence the playback of the contents 241 recorded on the MO media 240 is not allowed.

When the result of determination at step SC9 is "Yes", at step SC10 the AC check section 222 returns the license information 300 shown in FIG. 12C together with the check result of OK obtained at step SC9 to the ACM 213. At step SC11, the ACM 213 transfers the received license information 300 to the decryption section 223 of the MO device 220. When receiving the license information 300, at step SC12, the decryption section 223 acquires a key (=def=K2) from the MO device 220.

At step SC13, the decryption section 223 decrypts the license information 300 to that as shown in FIG. 12D using the key (=def=K2). The DSN (=456) is decrypted here as shown in FIG. 12D. At step SC14, the decryption section 223 transfers the decrypted license information 300 to the AC check section 222.

At step SC15, the AC check section 222 acquires a DSN (=456) from the MO device 220. At step SC16, the AC check section 222 determines whether the condition (DSN=456) of the decrypted license information 300 matches the DSN (=456). Assume that the two match. Therefore, the result of determination at step SC16 will be "Yes".

On the other hand, when the result of determination at step SC16 is "No", the process at step SC27 is performed. At step SC27, the AC check section 222 sends the check result of NG (no match) back to the ACM 213. Accordingly, at step SC28, the ACM 213 sends the check result of NG back to the MPEG2 playback control section 214, and ends the series of processing. Thus, this case indicates that the conditions for the license (MSN=123 & DSN=456) based on the license information 300 are not satisfied, thus the playback of the contents 241 recorded on the MO media 240 is not allowed.

When the result of determination at step SC16 is "Yes", at step SC17 the AC check section 222 returns the license information 300 shown in FIG. 12E together with the check result of OK obtained at step SC16 to the ACM 213. At step SC18, the ACM 213 transfers the received license information 300 to the decryption section 312 of the MPEG2 decoder 310. When receiving the license information 300, at step SC19, the decryption section 312 acquires a key (=ghi=K3) from the MPEG2 decoder 310.

At step SC20, the decryption section 312 decrypts the license information 300 to that as shown in FIG. 12F using the key (=ghi=K3). The DSN (=789) is decrypted here as shown in FIG. 12F. At step SC21, the decryption section 312 transfers the decrypted license information 300 to the AC check section 311.

Accordingly, at step SC22, the AC check section 311 acquires a DSN (=789) from the MPEG2 decoder 310. At step SC23, the AC check section 311 determines whether the condition (DSN=789) of the decrypted license information 300 matches the DSN (=789). Assume that, the two match. Therefore, the result of determination at step SC23 will be "Yes".

On the other hand, when the result of determination at step SC23 is "No", the process at step SC27 is performed. At step SC27, the AC check section 311 sends the check result of NG (no match) back to the ACM 213. At step SC28, the ACM 213 sends the check result of NG back to the MPEG2 playback control section 214, and ends the series of processing. Thus, this case indicates that the conditions for the license (MSN=123 & DSN=456 & DSN=789) based on the license information 300 are not satisfied, and hence the playback of the contents 241 recorded on the MO media 240 is not allowed.

When the result of determination at step SC23 is "Yes", at step SC24, the AC check section 311 sets a contents decryption key $K_c$ in the MPEG2 decoder 310. At step SC25, the AC check section 311 sends the check result of OK (match) obtained at step SC23 back to the ACM 213. At step SC26, the ACM 213 sends all the check results of OK obtained at step SC9, step SC16, and step SC23 back to the MPEG2 playback control section 214, and ends the series of processing. Thus, this case indicates that all the conditions of the license information 300 recorded on the MO media 240 are satisfied, and hence the playback of the contents 241 recorded on the MO media 240 is allowed.

The MPEG2 playback control section 214 reads out the encrypted contents 241 from the MO media 240 via the drive 221 and the file system 212, and transfers the contents 241 to the MPEG2 decoder 310. Thus, the MPEG2 decoder 310 decrypts the contents 241 using the contents decryption key $K_c$ set at step SC24 decodes and plays the moving pictures.

As explained above, according to the third embodiment, in addition to the plurality of blocked license information (MSN=123, DSN=456, and so on), the contents decryption key $K_c$ to decrypt the contents 241 is subjected to multiple encryption as shown in FIG. 11 to be recorded on the MO media 240. Thus, unauthorized access to the contents 241 can more effectively be prevented.

A case is explained the third embodiment where the file system 212 shown in FIG. 10 unconditionally reads out license information from the MO media 240. However, for the purpose of achievement in higher security, the invention may be configured so that encrypted license information is stored on a secured region (encrypted region) of the MO media 240 and only the file system, that can decrypt this encrypted license information, can read out the license information. This case is explained below as a fourth embodiment.

Figure 14:
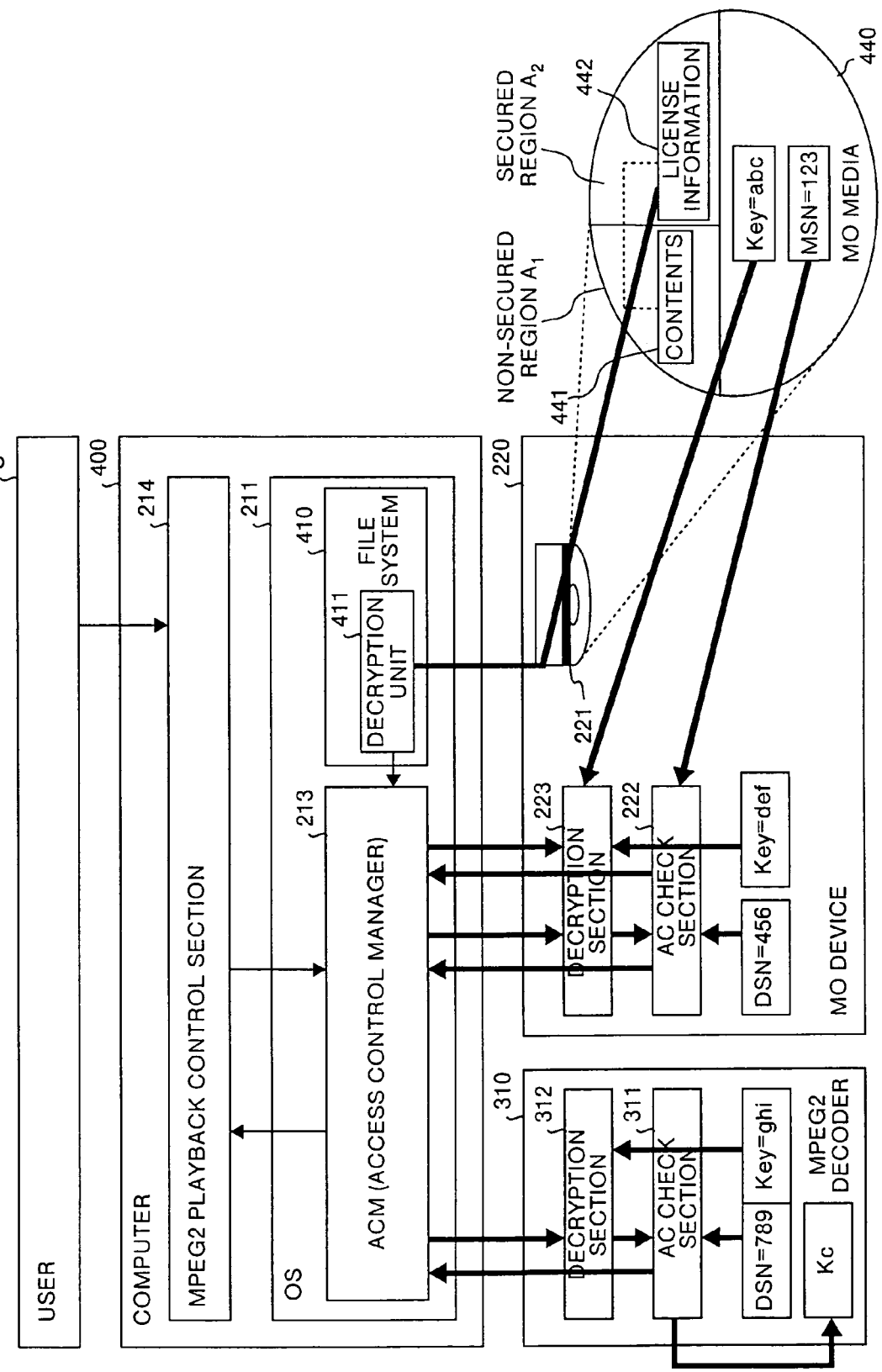
FIG. 14 is a block diagram showing the configuration of the fourth embodiment of this invention.

FIG. 14 is a block diagram showing a configuration of the fourth embodiment of this invention. Same legends are assigned in this figure to the sections that are similar to those in FIG.

10. As shown in FIG. 14, MO media 440 and computer 400 are provided instead of the MO media 240 and the computer 210 shown in FIG. 10.

Figure 15:
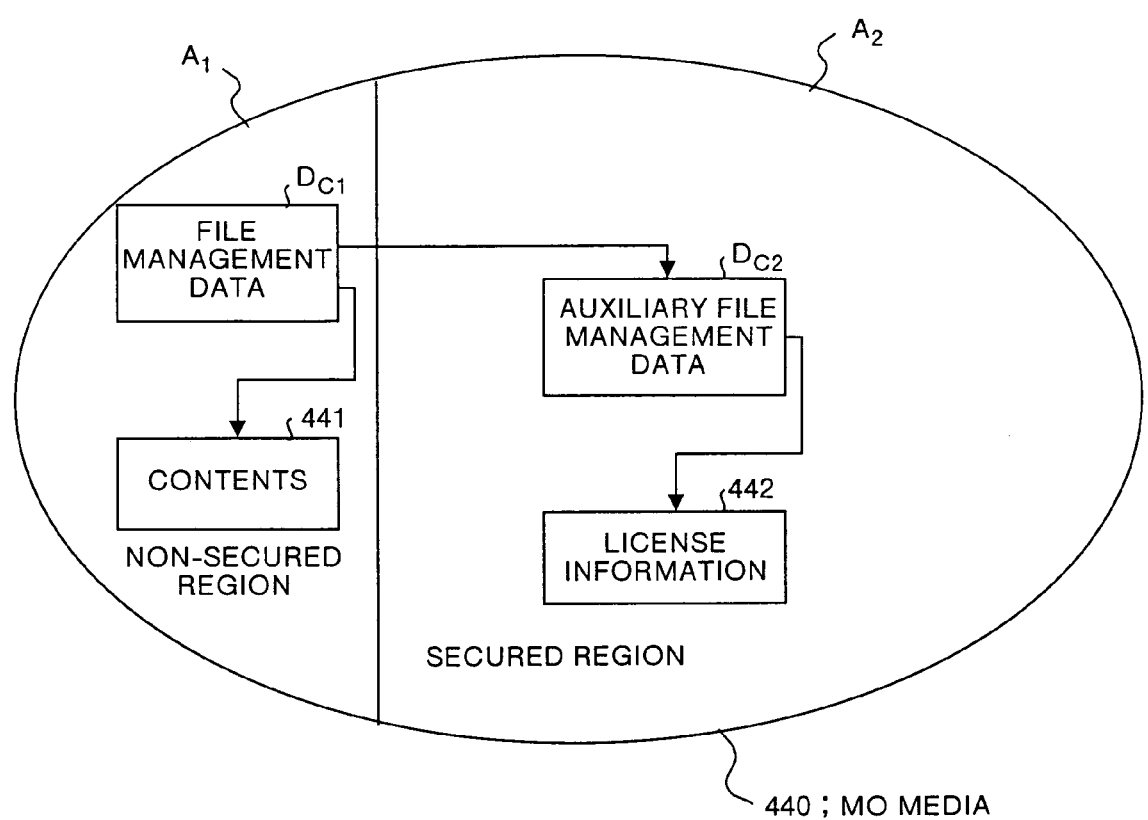
FIG. 15 is a diagram showing the data structure of the MO media 440 shown in FIG. 14.

The MO media 440 shown in FIG. 14 has a non-secured region $A_1$ where encrypted contents 441 is stored and a secured region $A_2$ where encrypted license information 442 is stored as shown in detail in FIG. 15. The non-secured region $A_1$ is a user region to which access can be made using any ordinary file system. Whereas, the secured region $A_2$ is a region to which access can not be made by the ordinary file system, namely, to which only a file system 410 having a decryption unit 411 shown in FIG. 14 can get access.

The license information 442 shown in FIG. 15 is obtained by encrypting the license information 300 (see FIG. 10 and FIG. 11). Therefore, the MSN=123, the DSN=456, the DSN=789, and the contents decryption key $K_c$ shown in FIG. 11 are included in the license information 442. Further, the license information 442 is managed by auxiliary file management data $D_{C2}$ as shown in FIG. 15.

On the other hand, file management data $D_{C1}$ in the non-secured region $A_1$ is data for managing the contents 441 and also for managing indirectly the license information 442 via auxiliary file management data $D_{C2}$. Thus, the contents 441 and the license information 442 are correlated with each other via the file management data $D_{C1}$ and the auxiliary file management data $D_{C2}$ on the MO media 440. Referring to FIG. 14, the file system 410 of the computer 400 reads out the license information 442, the contents 441, the Key=abc, and MSN=123 from the MO media 440, respectively. The decryption unit 411 decrypts the encrypted license information 442.

Figure 16:
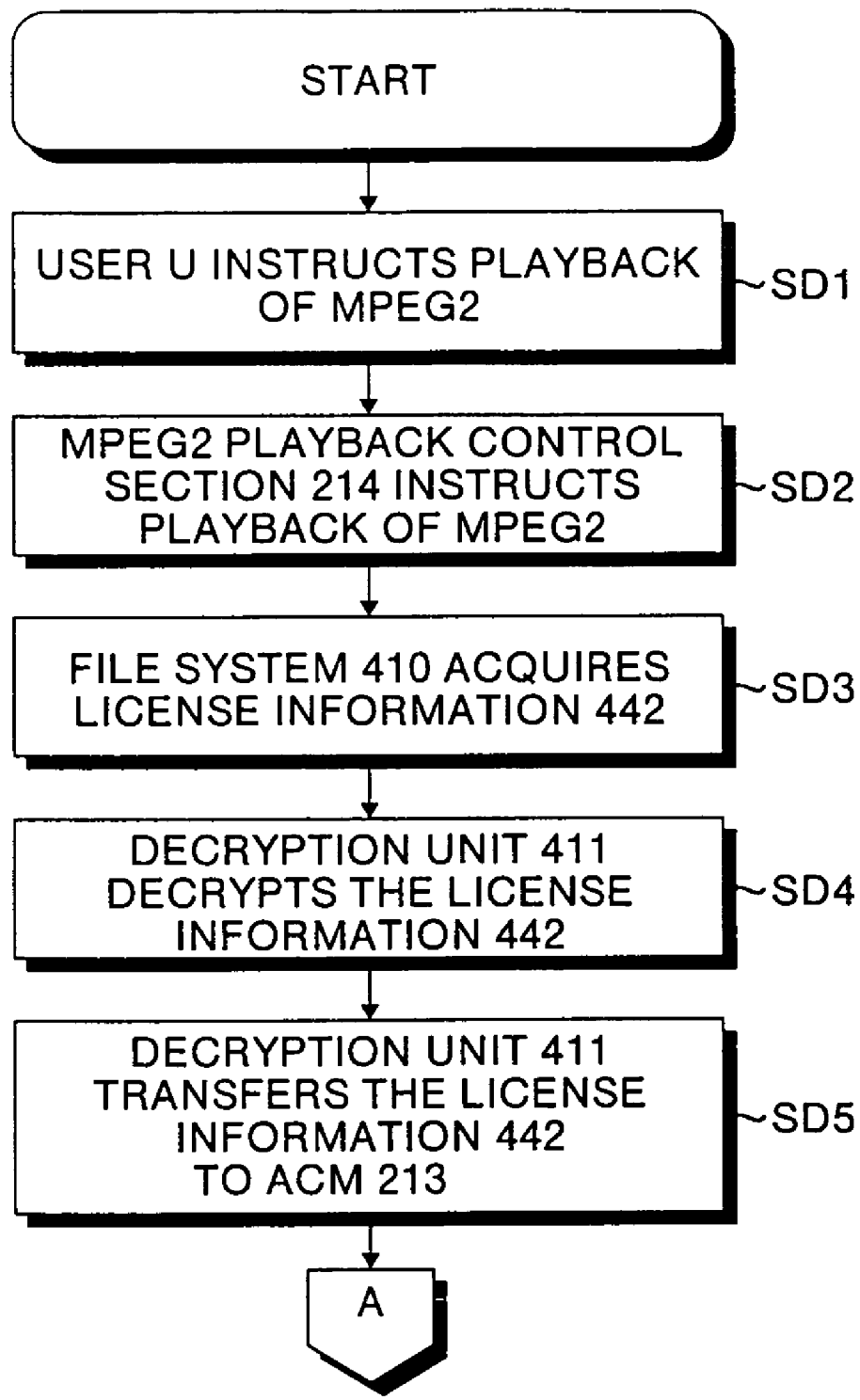
FIG. 16 is a flow chart showing the operation of the fourth embodiment.

Operation of the fourth embodiment will be explained below with reference to flow charts shown in FIG. 16 and FIG. 17. It is assumed here that the MO media 440 is set in the drive 221 of the MO device 220. When the user U instructs playback of MPEG2 contents to the MPEG2 playback control section 214 at step SD1 as shown in FIG. 16, at step SD2, the MPEG2 playback control section 214 instructs the playback of the MPEG2 contents to the ACM 213.

At step SD3, the file system 410 accesses the secured region $A_2$ of the MO media 440 to acquire the encrypted license information 442, and then transfers the information to the decryption unit 411. At step SD4, the decryption unit 411 decrypts the encrypted license information 442 using a specified key. At step SD5, the decryption unit 411 transfers the decrypted license information 442 to the ACM 213.

Figure 17:
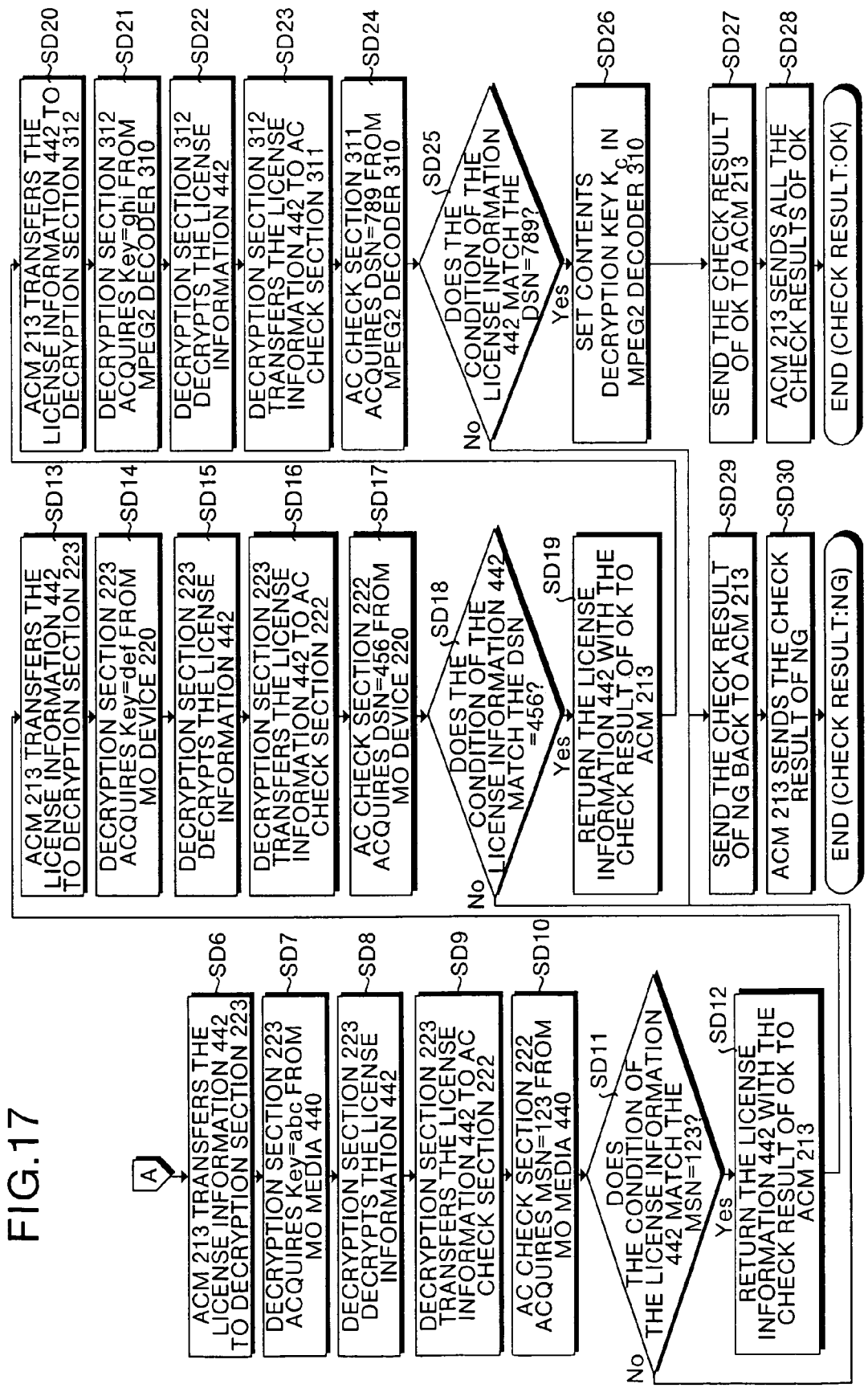
FIG. 17 is a flow chart showing the operation of the fourth embodiment.

At step SD6 shown in FIG. 17, the ACM 213 transfers the decrypted license information 442 to the decryption section 223 of the MO device 220. At step SD7, the decryption section 223 acquires a key (=abc=K1 (see FIG. 12A) from the MO media 440, and proceeds to step SD8. At step SD8, the decryption section 223 decrypts the license information 442 to that as shown in FIG. 12B using the key (=abc). The MSN (=123) is decrypted here as shown in FIG. 12B. At step SD9, the decryption section 223 transfers the decrypted license information 442 to the AC check section 222.

At step SD10, the AC check section 222 acquires an MSN (=123) from the MO media 440. At step SD11, the AC check section 222 determines whether the condition (MSN=123) of the decrypted license information 442 shown in FIG. 12B matches the MSN (=123). Assume that the two match. Therefore, the result of determination at step SD11 will be "Yes".

On the other hand, when the result of determination at step SD11 is "No", the process at step SD29 is performed. At step SD29, the AC check section 222 sends the check result of NG (no match) back to the ACM 213. Accordingly, at step SD30, the ACM 213 sends the check result of NG back to the MPEG2 playback control section 214, and ends the series of processing. Thus, this case indicates that the condition for the license (MSN=123) based on the license information 442 is not satisfied, and hence the playback of the contents 441 recorded on the MO media 440 is not allowed.

When the result of determination at step SD11 is "Yes", at step SD12, the AC check section 222 returns the license information 442 (see FIG. 12C) together with the check result of OK obtained at step SD11 to the ACM 213. Accordingly, at step SD13, the ACM 213 transfers the received license information 442 to the decryption section 223 of the MO device 220. When receiving the license information 442, at step SD14, the decryption section 223 acquires a key (=def=K2) from the MO device 220.

At step SD15, the decryption section 223 decrypts the license information 442 to that as shown in FIG. 12D using the key (=def=K2). The DSN (=456) is decrypted here as shown in FIG. 12D. At step SD16, the decryption section 223 transfers the decrypted license information 442 to the AC check section 222.

At step SD17, the AC check section 222 acquires a DSN (=456) from the MO device 220. At step SD18, the AC check section 222 determines whether the condition (DSN=456) of the decrypted license information 442 matches the DSN (=456). Assume that the two match. Therefore, the result of determination at step SD18 will be "Yes".

On the other hand, when the result of determination at step SD18 is "No", the process at step SD29 is performed. At step SD29, the AC check section 222 sends the check result of NG (no match) back to the ACM 213. Accordingly, at step SD30, the ACM 213 sends the check result of NG back to the MPEG2 playback control section 214, and ends the series of processing. Thus, this case indicates that the conditions for the license (MSN=123 & DSN=456) based on the license information 442 are not satisfied, and hence the playback of the contents 241 recorded on the MO media 440 is not allowed.

When the result of determination at step SD18 is "Yes", at step SD19, the AC check section 222 returns the license information 442 shown in FIG. 12E together with the check result of OK obtained at step SD18 to the ACM 213. At step SD20, the ACM 213 transfers the received license information 442 to the decryption section 312 of the MPEG2 decoder 310. When receiving the license information 442, at step SD21, the decryption section 312 acquires a key (=ghi=K3) from the MPEG2 decoder 310.

At step SD22, the decryption section 312 decrypts the license information 442 to that as shown in FIG. 12F using the key (=ghi=K3). The DSN (=789) is decrypted here as shown in FIG. 12F. At step SD23, the decryption section 312 transfers the decrypted license information 442 to the AC check section 311.

At step SD24, the AC check section 311 acquires a DSN (=789) from the MPEG2 decoder 310. At step SD25, the AC check section 311 determines whether the condition (DSN=789) of the decrypted license information 442 matches the DSN (=789). Assume that the two match. Therefore, the result of determination at step SD25 will be "Yes".

On the other hand, when the result of determination at step SD25 is "No", the process at step SD29 is performed. At step SD29, the AC check section 311 sends the check result of NG (no match) back to the ACM 213. Accordingly, at step SD30, the ACM 213 sends the check result of NG back to the MPEG2 playback control section 214, and ends the series of processing. Thus, this case indicates that the conditions for the license (MSN=123 & DSN=456 & DSN=789) based on the license information 442 are not satisfied, and hence the playback of the contents 441 recorded on the MO media 440 is not allowed.

When the result of determination at step SD25 is "Yes", at step SD26 the AC check section 311 sets a contents decryption key $K_c$ in the MPEG2 decoder 310. At step SD27, the AC check section 311 sends the check result of OK (match) obtained at step SD25 back to the ACM 213. Accordingly, at step SD28, the ACM 213 sends all the check results of OK obtained at step SD11, step SD18, and step SD25 back to the MPEG2 playback control section 214, and ends the series of processing. Thus, this case indicates that all the conditions of the license information 442 recorded on the MO media 440 are satisfied, and hence the playback of the contents 241 recorded on the MO media 240 is allowed.

The MPEG2 playback control section 214 reads out the encrypted contents 441 from the MO media 440 via the drive 221 and the file system 410, and transfers the read-out contents 441 to the MPEG2 decoder 310. Thus, the contents 441 decrypted by the contents decryption key $K_c$ set at step SD26 are decoded to the moving pictures in the MPEG2 decoder 310.

Figure 18:
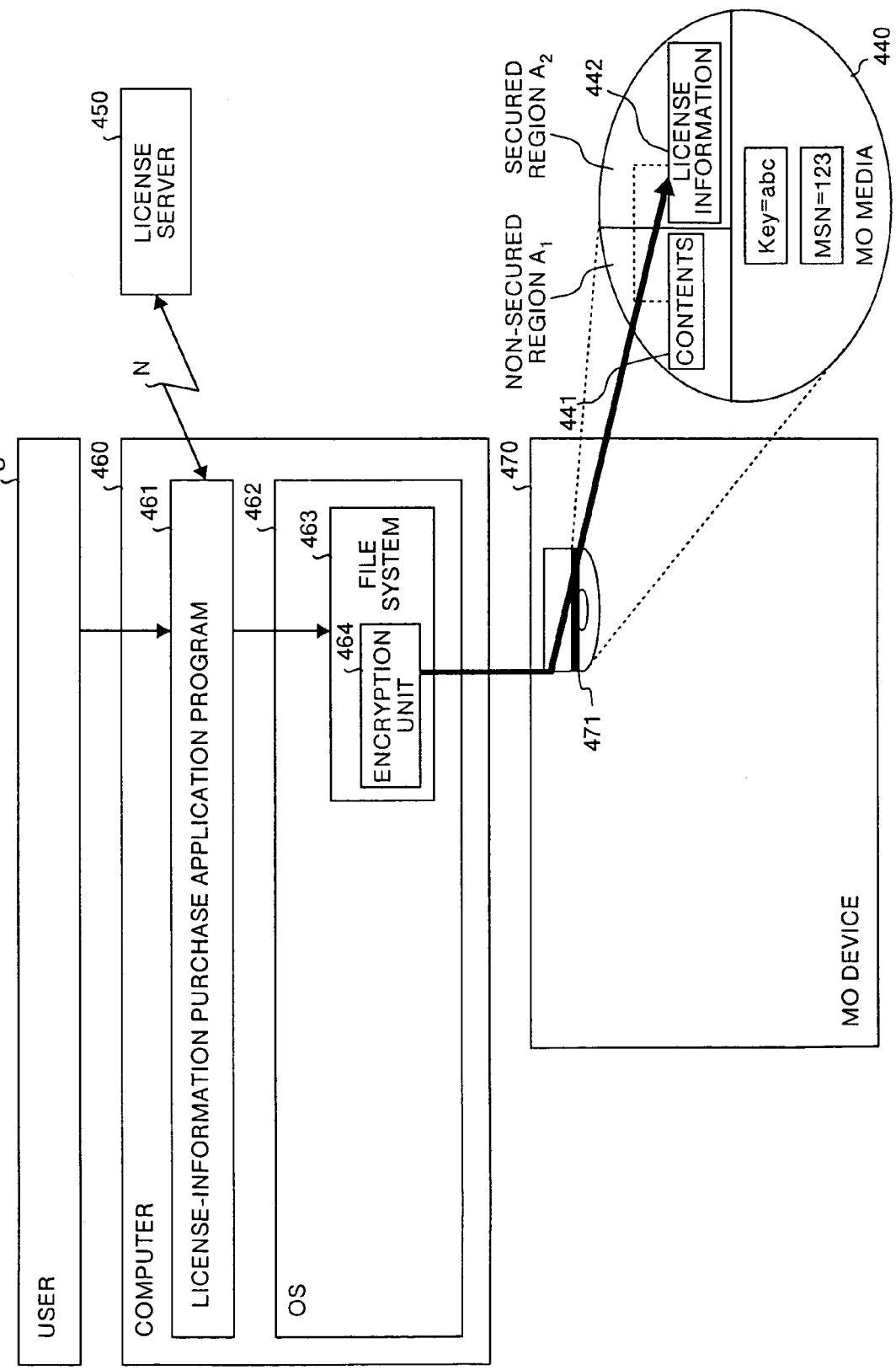
FIG. 18 is a block diagram showing the configuration of the data write device in the fourth embodiment.

A data write device that writes the license information 442 shown in FIG. 14 on the MO media 440 where the contents 441, the Key=abc, and the MSN=123 have already been stored is explained below with reference to FIG. 18. The license information 442 is not stored on the MO media 440. A computer 460 in FIG. 18 is a device which is installed in a station (for example, railway station or bus station) or in a convenience store, or some similar places, and through which license information is purchased. A license-information purchase application program 461 for purchasing license information is started up in this computer 460. OS 462 controls the license-information purchase application program 461.

A file system 463 manages files handled in the computer 460 and controls read/write of data. An encryption unit 464 encrypts data to be written onto the MO media 440. A license server 450 is placed in the side of contents provider, and it is connected to the computer 460 via a network N. This license server 450 sells the license information. MO device 470 is provided to the computer 460 externally (or internally), and writes data onto MO media (MO media 440 in FIG. 18). This MO device 470 has a drive 471 to drive the MO media.

Figure 19:
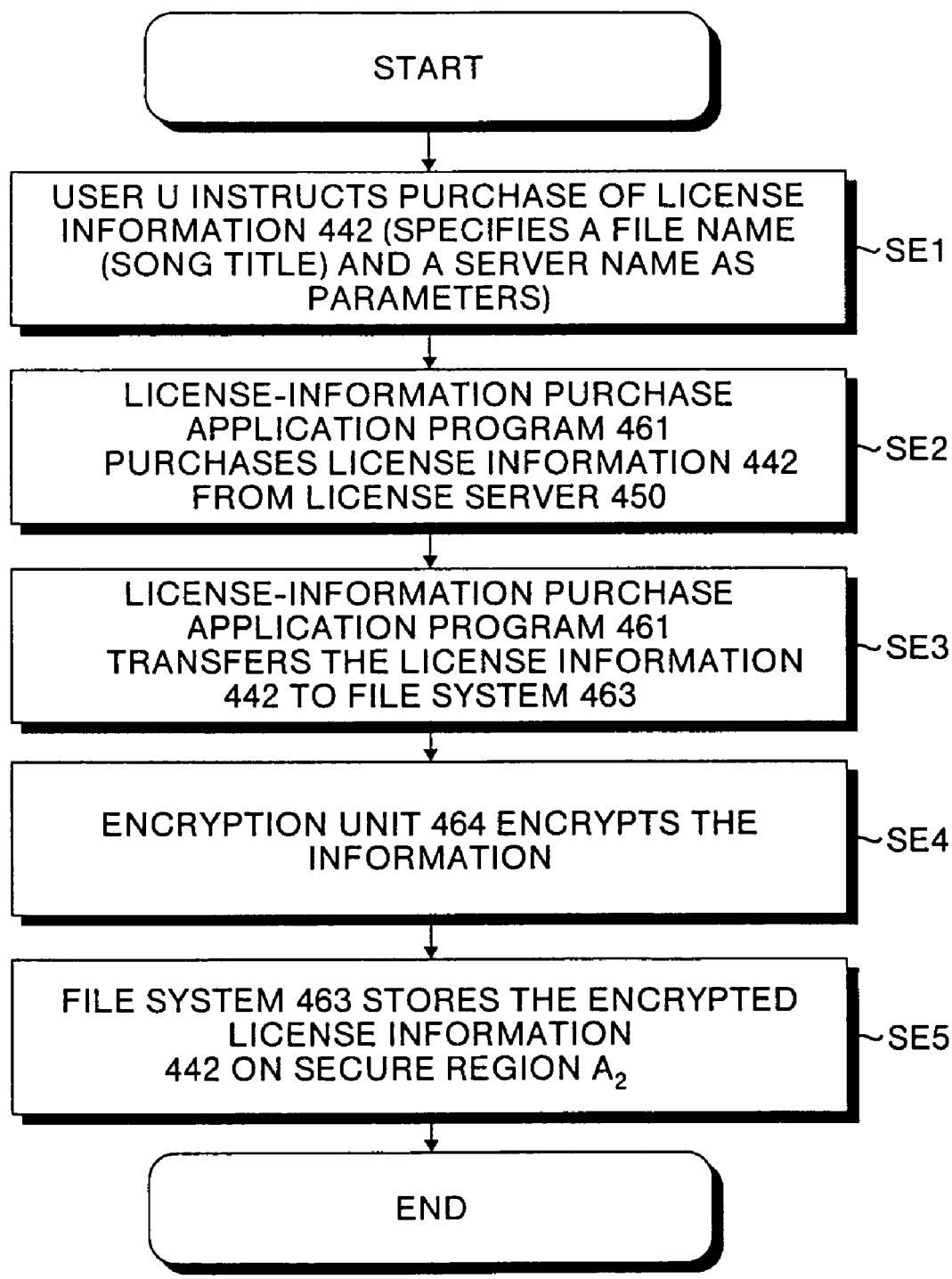
FIG. 19 is a flow chart showing the operation of the data write device shown in FIG. 18.

Operation of the data write unit shown in FIG. 18 will be explained below with reference to FIG. 19. At step SE1 shown in FIG. 19, the user U instructs to purchase license information 442 by entering parameters such as a file name (e.g., title of the song) and a server name using a not shown input device. Accordingly, at step SE2, the license-information purchase application program 461 purchases (acquires) the license information 442 from the license server 450 via the network N.

At step SE3, the license-information purchase application program 461 transfers the license information 442 to the file system 463. At step SE4, the encryption unit 464 of the file system 463 encrypts the license information 442 using a predetermined key. At step SE5, the file system 463 stores the encrypted license information 442 on the secured region $A_2$ (see FIG. 15) of the MO media 440 through the MO device 470.

As explained above, according to the fourth embodiment, the encrypted license information 442 is recorded on the secured region $A_2$ of the MO media 440 as shown in FIG. 15. Therefore, unauthorized access to the contents 441 can be prevented.

Figure 20:
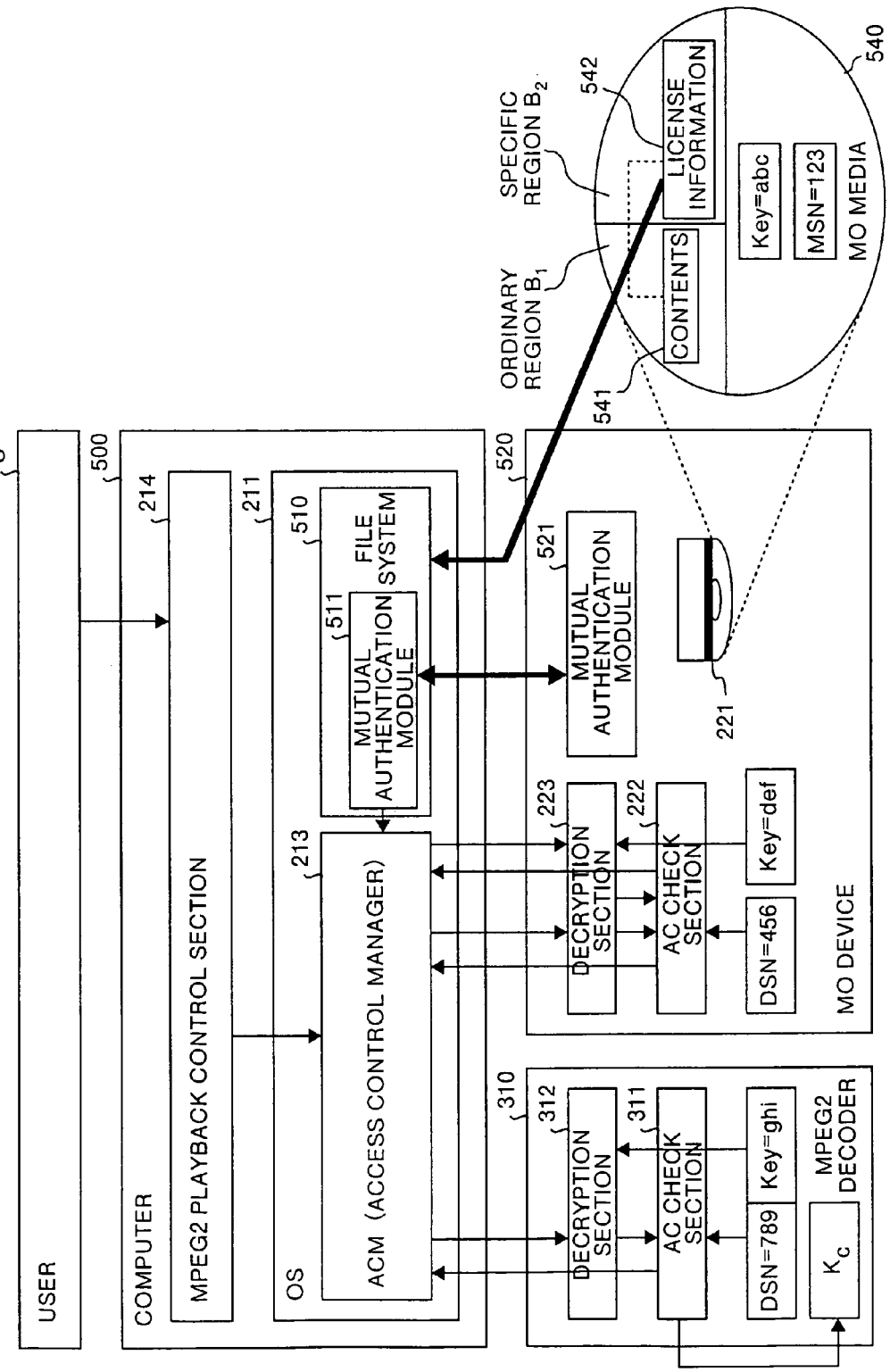
FIG. 20 is a block diagram showing the configuration of the fifth embodiment of this invention.

FIG. 20 is a block diagram showing a configuration of a fifth embodiment of this invention. Same legends are assigned in this figure to the sections that are similar to those in FIG. 10. MO media 540, computer 500, and MO device 520 are provided instead of the MO media 240, the computer 210, and the MO device 220 shown in FIG. 10.

Figure 21:
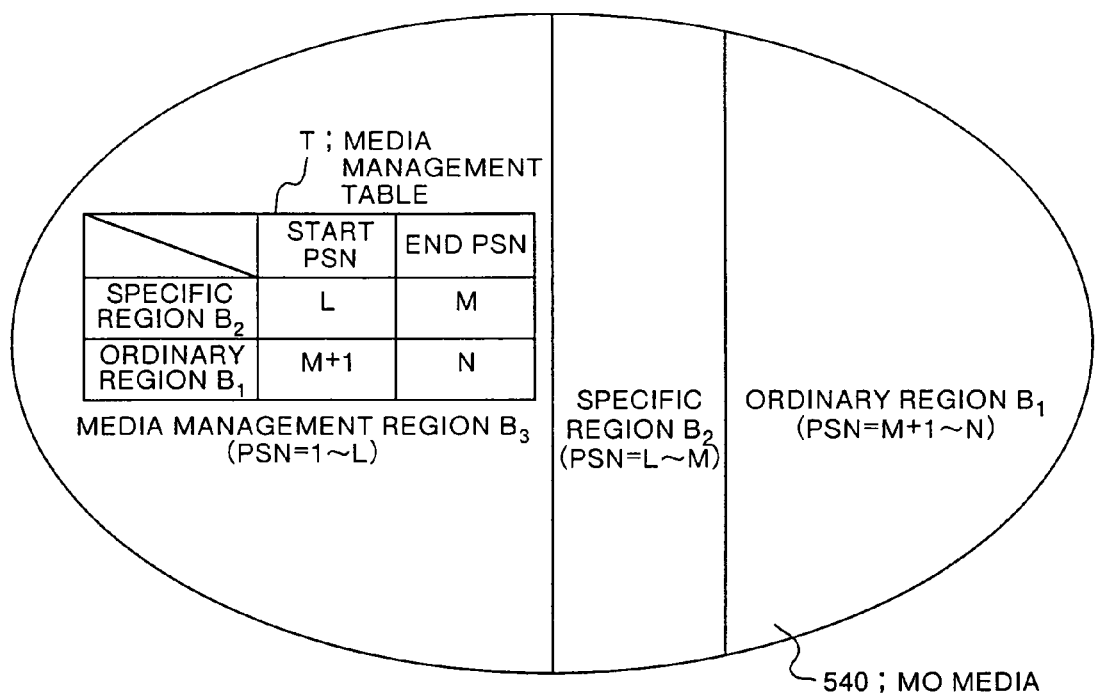
FIG. 21 is a diagram showing the data structure of the MO media 540 shown in FIG. 20.

The MO media 540 shown in FIG. 20 has an ordinary region $B_1$, a specific region $B_2$, and a media management region $B_3$ as shown in detail in FIG. 21. The ordinary region $B_1$ is where contents 541 is stored, and this ordinary region $B_1$ extends from PSN (Physical Sector Number)=M+1 to PSN=N. The specific region $B_2$ is where access can be made only when a mutual authentication command (specific command) explained later is issued and the license information 542 shown in FIG. 20 is stored. This license information 542 has the same data structure as that of license information 300. This specific region $B_2$ extends from PSN=L to PSN=M.

The media management region $B_3$ is where a media management table T, that defines ranges of the ordinary region $B_1$ and the specific region $B_2$ on the MO media 540, is stored. Start PSNs (header number of each of the physical sector numbers) of the ordinary region $B_1$ and the specific region $B_2$ are defined in this media management table T. Further, end PSNs (end number of each of the physical sector numbers) of the ordinary region $B_1$ and the specific region $B_2$ are also defined in the table T. This media management region $B_3$ extends from PSN=1 to PSN=L.

Referring to FIG. 20, Key=abc and MSN=123, in addition to the contents 541 and the license information 542, are stored on the MO media 540 in the same manner as that of the MO media 240 (see FIG. 10). A file system 510 in the computer 500 manages files handled by the computer 500 and controls read/write of data. A mutual authentication module 511 holds secret information (henceforth, computer-side secret information) common to secret information (henceforth, MO device-side secret information) held by a mutual authentication module 521 of the MO device 520.

The mutual authentication module 511 performs mutual authentication with the mutual authentication module 521 when the mutual authentication command is issued. precisely, the mutual authentication module 511 transmits computer-side secret information to the mutual authentication module 521, and performs mutual authentication depending on whether the MO device-side secret information from the mutual authentication module 521 matches the computer-side secret information held by the module 511. The file system 510 can read out the license information 542 from the specific region $B_2$ of the MO media 540 only when these two modules are mutually authenticated.

Referring to the MO device 520, the mutual authentication module 521 holds, as explained above, the MO device-side secret information common to the computer-side secret information held by the mutual authentication module 511 of the file system 510. When receiving the computer-side secret information from the mutual authentication module 511, the mutual authentication module 521 transmits the MO device-side secret information held by the module 521 to the mutual authentication module 511. Further, the mutual authentication module 521 performs mutual authentication depending on whether the computer-side secret information from the mutual authentication module 511 matches the MO device-side secret information held by the module 521.

Operation of the fifth embodiment will be explained below with reference to flow charts shown in FIG. 22 and FIG. 13. It is assumed here that the MO media 540 is set in the drive 221 of the MO device 520 shown in FIG. 20. When the user U instructs playback of MPEG2 contents to the MPEG2 playback control section 214 at step SF1 shown in FIG. 22, at the next step SF2 the MPEG2 playback control section 214 instructs the playback of the MPEG2 contents to the ACM 213.

At step SF3, a mutual authentication command is issued from the ACM 213 to the file system 510, and mutual authentication is performed between the mutual authentication module 511 and the mutual authentication module 521. In other words, the mutual authentication module 511 of the file system 510 transmits the computer-side secret information to the mutual authentication module 521 of the MO device 520. When this computer-side secret information is received, the mutual authentication module 521 transmits the MO device-side secret information to the mutual authentication module 511.

The mutual authentication module 521 then determines whether the received computer-side secret information matches the MO device-side secret information held by the module 521, and transfers the result of the determination to the mutual authentication module 511. On the other hand, when receiving the MO device-side secret information from the mutual authentication module 521, the mutual authentication module 511 then determines whether the received MO device-side secret information matches the computer-side secret information held by the module 511.

At step SF4, the file system 510 determines whether mutual authentication has been obtained based on both of the result of determination on the mutual authentication in the mutual authentication module 511 and the result of determination on the mutual authentication in the mutual authentication module 521. When respective results of the determination indicate "match", the file system 510 transfers the result of mutual authentication of OK to the ACM 213, and determines that the result of determination at step SF4 is "Yes".

Accordingly, at step SC3 shown in FIG. 13, the ACM 213 acquires the license information 542 from the specific region $B_2$ of the MO media 540 via the file system 510. From then on, the processing from step SC4 to step SC28 is executed in the same manner as that of the third embodiment. It is assumed in the fifth embodiment that the MO media 540, the license information 542, the contents 541, the file system 510, and the MO device 520 are substituted for the MO media 240, the license information 300, the contents 241, the file system 212, and the MO device 220, respectively.

Figure 22:
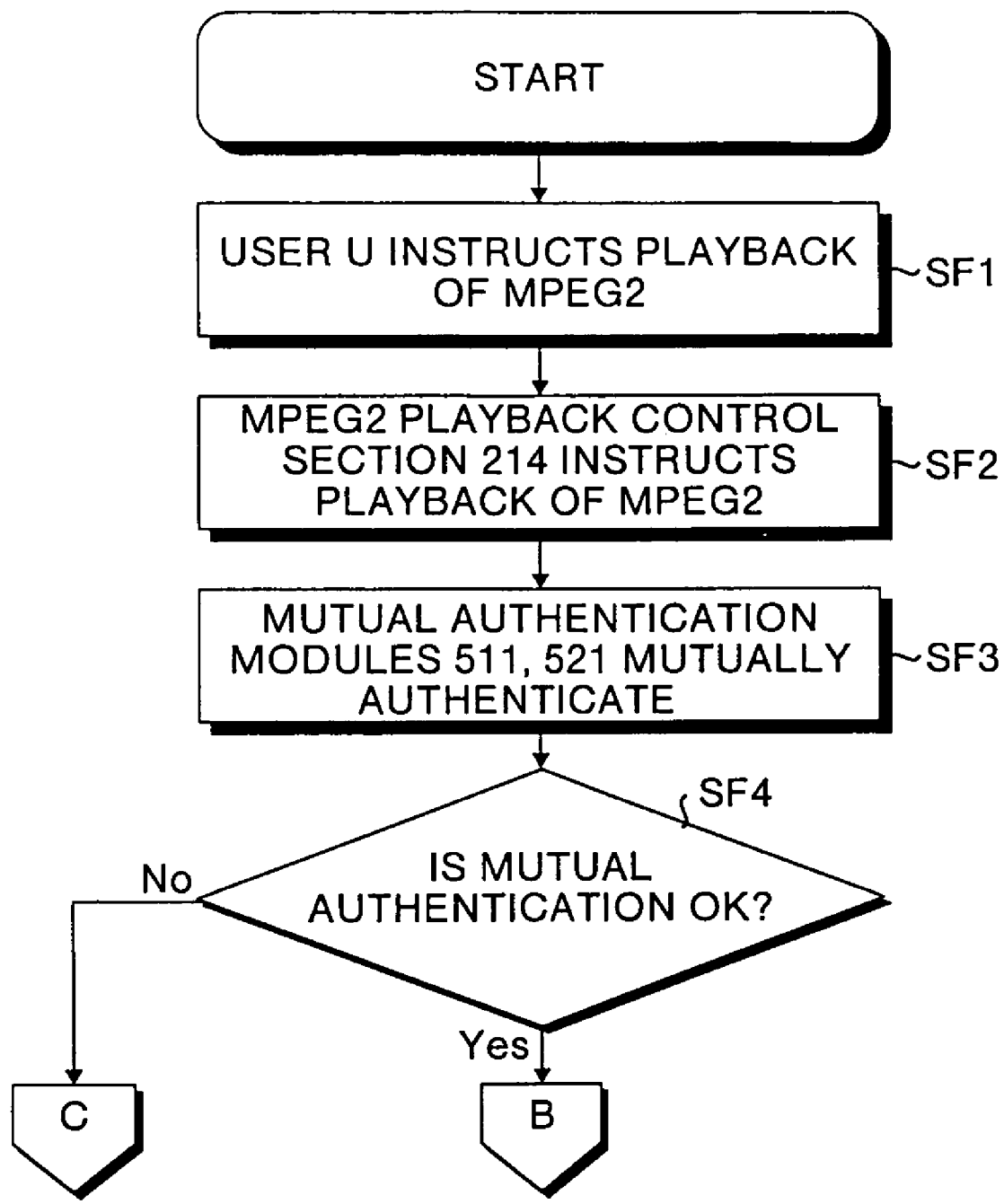
FIG. 22 is a flow chart showing the operation of the fifth embodiment.

On the other hand, at step SF4 shown in FIG. 22, when both of the result of the determination on mutual authentication in the mutual authentication module 511 and the result of the determination on mutual authentication in the mutual authentication module 521 indicate "no match", the file system 510 determines that the result of determination is "No", and proceeds to step SC27 shown in FIG. 13. At step SC27, the file system 510 transfers the mutual authentication result of NG (no match) to the ACM 213. In this case, mutual authentication is not obtained, therefore, there is no possibility that the license information 542 is read out from the specific region $B_2$ of the MO media 540 shown in FIG. 20.

Figure 23:
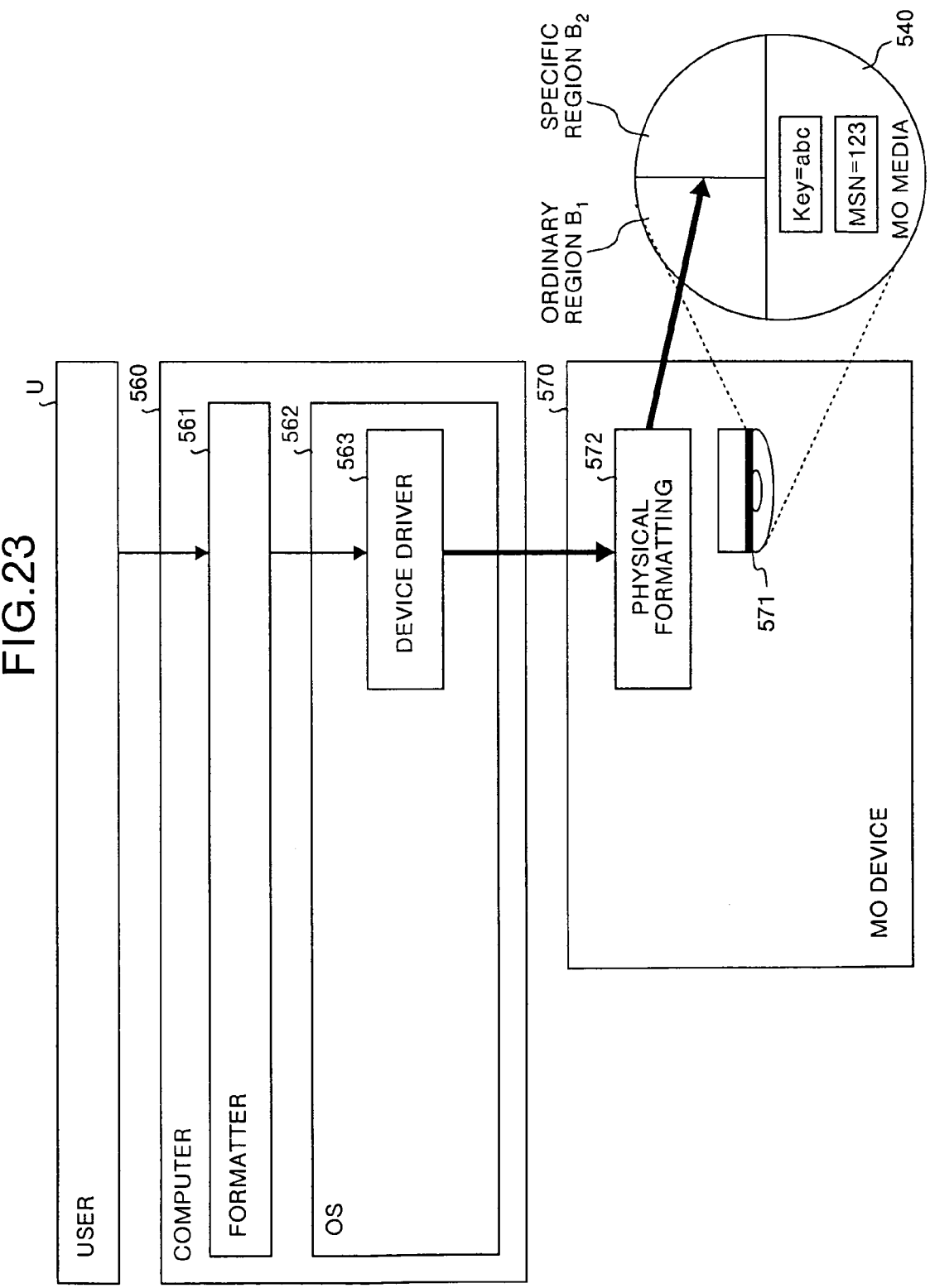
FIG. 23 is a block diagram showing the configuration of the formatting device in the fifth embodiment.

A formatting device that sets an ordinary region $B_1$ and a specific region $B_2$ in the MO media 540 shown in FIG. 20 is explained below with reference to FIG. 23. Computer 560 shown in this figure physically formats the MO media 540. A formatter 561 provides controls for a physical format of the MO media 540. OS 562 controls various types of application programs. A device driver 563 drives an MO device 570. The MO device 570 is provided to the computer 560 externally (or internally). This MO device 570 has a drive 571 that drives the MO media and performs physical formatting.

Figure 24:
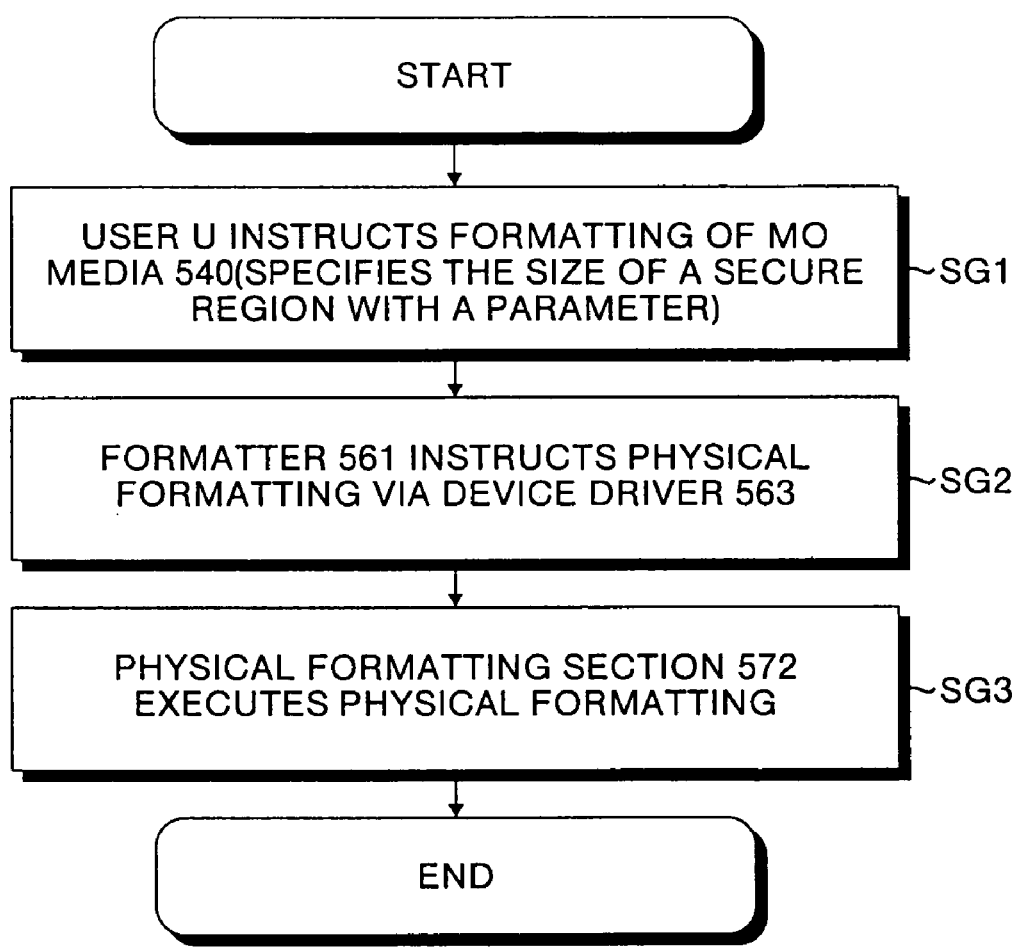
FIG. 24 is a flow chart showing the operation of the formatting device shown in FIG. 23.

Operation of the formatting device shown in FIG. 23 will be explained below with reference to FIG. 24. At step SG1, the user U instructs formatting of the MO media 540 by specifying the size of the secured region (specific region $B_2$) using a not shown input device. Accordingly, at step SG2, the formatter 561 instructs physical formatting to a physical formatting section 572 via the device driver 563. At step SG3, the physical formatting section 572 then executes physical formatting on the MO media 540. Thus, an ordinary region $B_1$ and a specific region $B_2$ are formed on the MO media 540.

As explained above, according to the fifth embodiment, the license information 542 is recorded on the specific region $B_2$ of the MO media 540 shown in FIG. 21. The license information 542 is then acquired from the specific region $B_2$ only when respective mutual authentication is obtained in both of the mutual authentication module 511 and the mutual authentication module 521. Therefore, the license can be disapproved at the instant at which it is determined that mutual authentication is not obtained. Thus, unauthorized access to the contents 541 can be prevented.

A case is explained in the fourth embodiment where the MO media 440 has the non-secured region $A_1$ and the secured region $A_2$ as shown in FIG. 15. Further, a case is explained in the fifth embodiment where the MO media 540 has the ordinary region $B_1$ and the specific region $B_2$ as shown in FIG. 21. A combination of the fourth embodiment (non-secured region $A_1$ and secured region $A_2$) with the fifth embodiment (ordinary region $B_1$ and specific region $B_2$) is explained below as a sixth embodiment.

Figure 25:
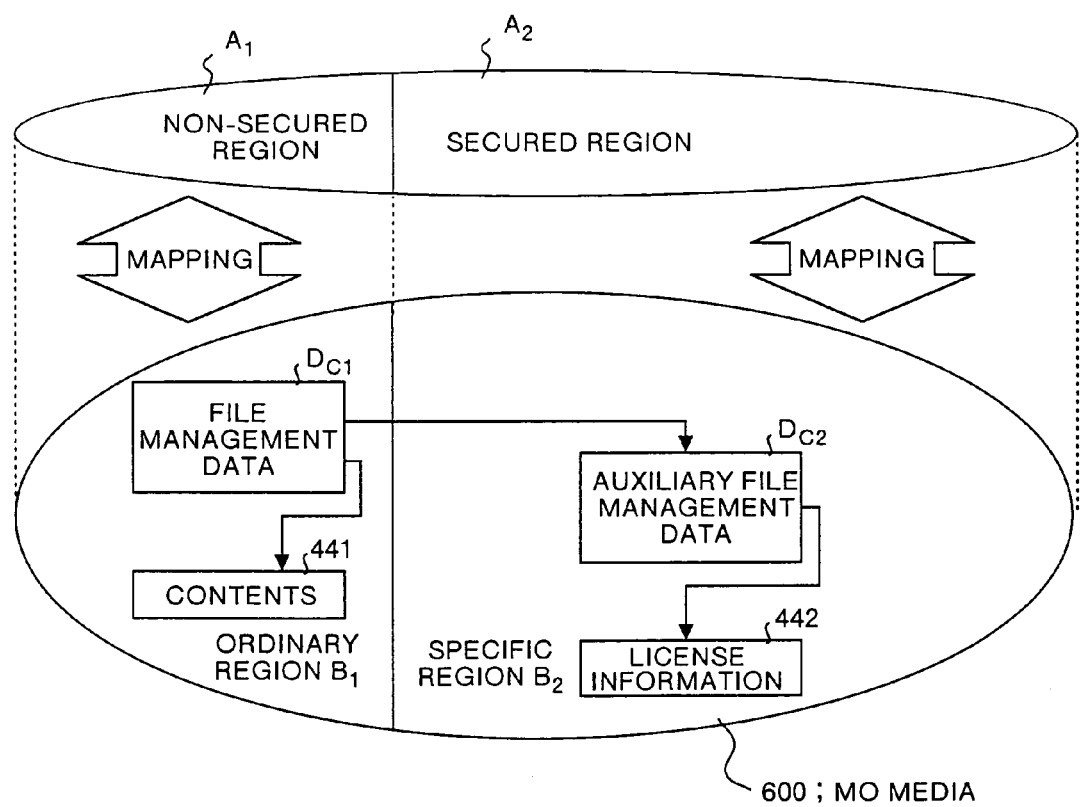
FIG. 25 is a diagram showing the data structure of the MO media 600 in the sixth embodiment of this invention.

MO media 600 shown in FIG. 25 is used in the sixth embodiment. The MO media 600 shown in this figure has the ordinary region $B_1$ (see FIG. 21) and the non-secured region $A_1$ (see FIG. 15) mapped with each other, and also has the specific region $B_2$ (see FIG. 21) and the secured region $A_2$ (see FIG. 15) mapped with each other. Further, the ordinary region $B_1$ (corresponding to the non-secured region $A_1$) stores the contents 441 and the file management data $D_{c_1}$ that manages the contents. Whereas, the specific region $B_2$ (corresponding to the secured region $A_2$) stores the license information 442 and the file management data $D_{C2}$ that manages the license information.

As explained above, according to the sixth embodiment, the secured region $A_2$ is mapped to the specific region $B_2$, both of which are effective in security. Thus, extremely high security can be ensured.

Figure 26:
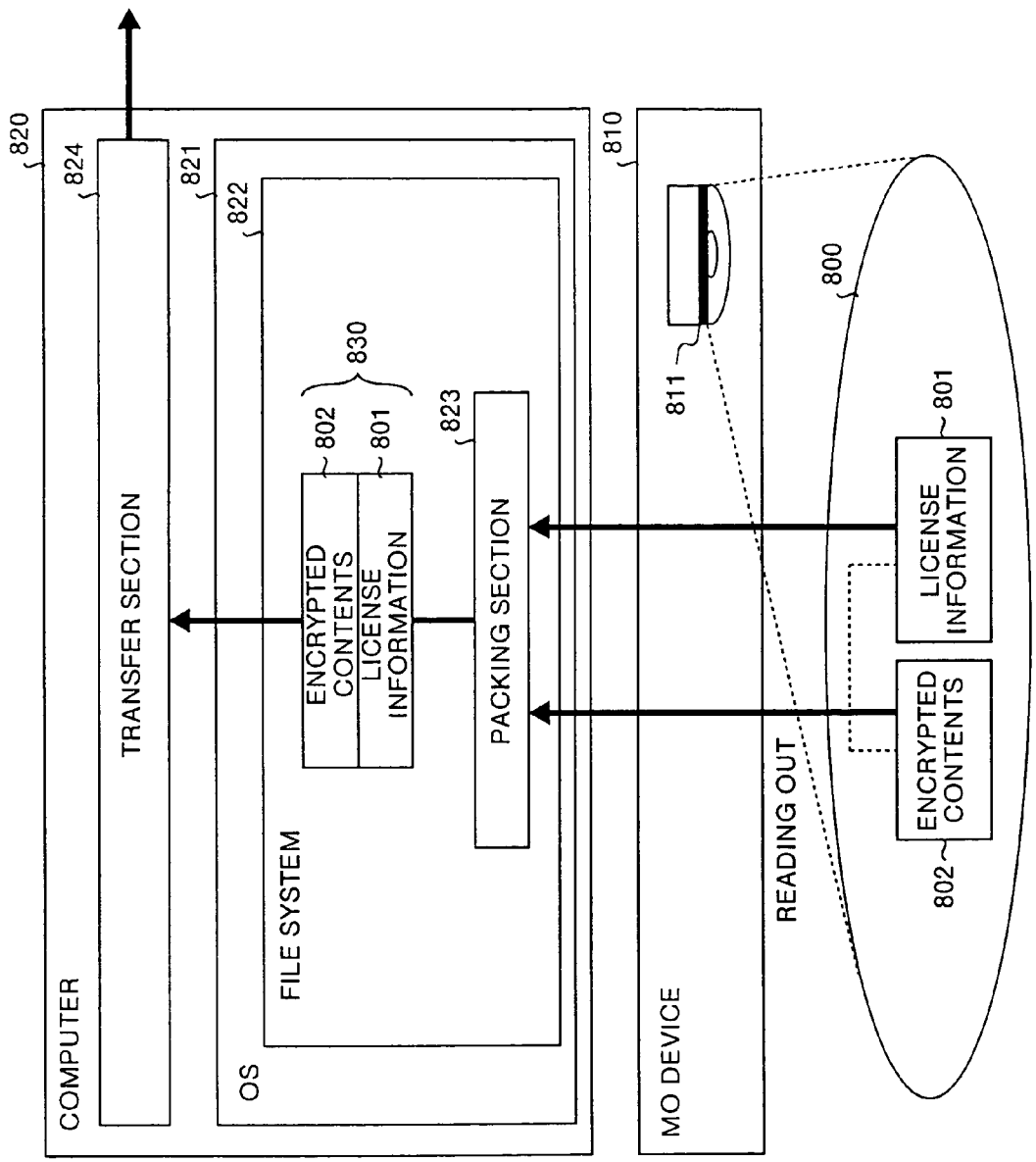
FIG. 26 is a block diagram showing the configuration of the packed data generating device in the seventh embodiment of this invention.
Figure 27:
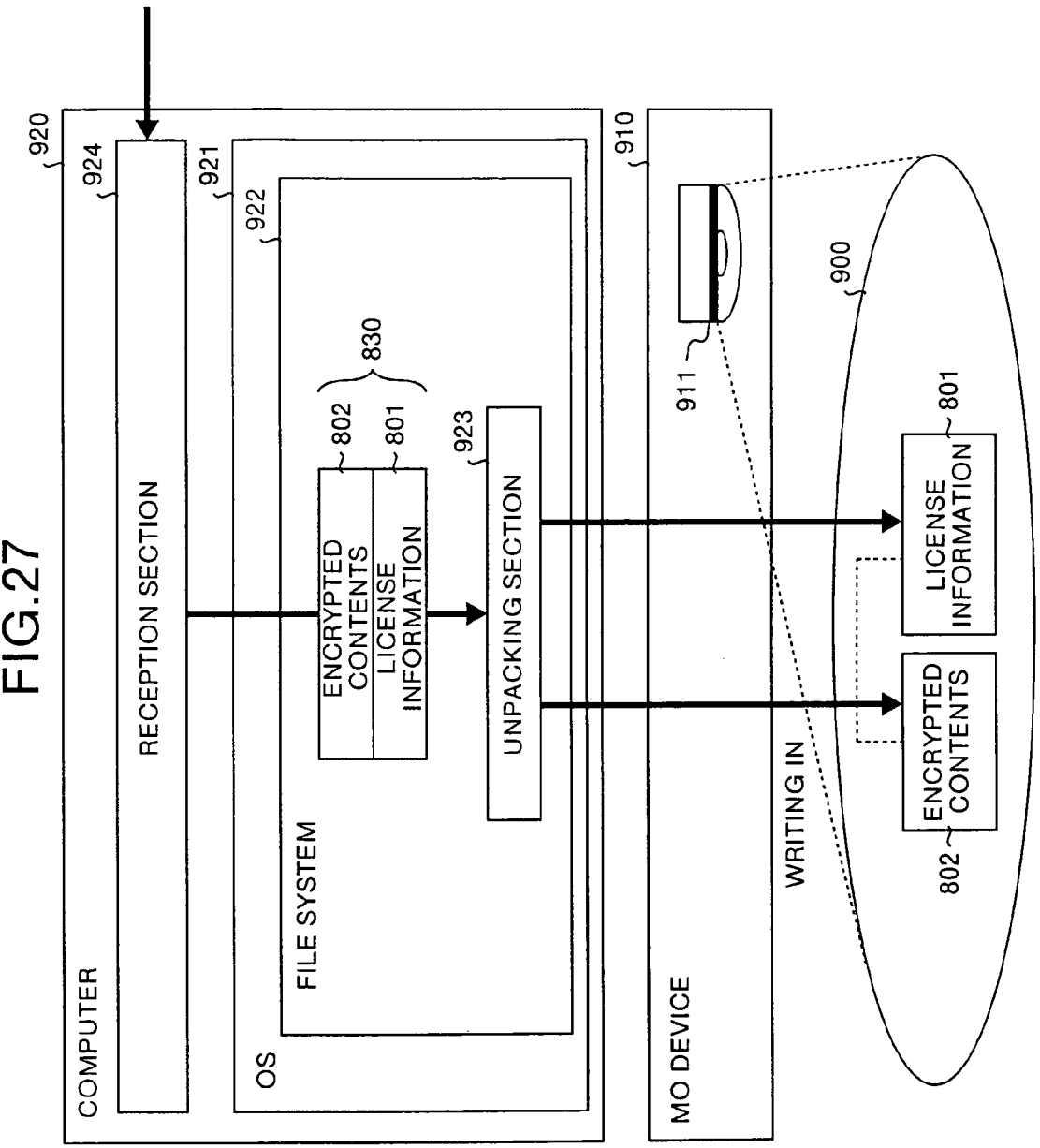
FIG. 27 is a block diagram showing the configuration of the unpacking device in the seventh embodiment.

The contents and the license information (AC) stored on MO media in the first to sixth embodiments may be transferred to another MO media. This case is explained below as a seventh embodiment. FIG. 26 is a block diagram showing a configuration of a packed data generating device according to the seventh embodiment of this invention. FIG. 27 is a block diagram showing a configuration of an unpacking device according to the seventh embodiment of this invention.

These packed data generating device (see FIG. 26) and unpacking device (see FIG. 27) are connected to each other via a not shown cable or a network. The packed data generating device shown in FIG. 26 transfers license information 801 and encrypted contents 802, that are stored on MO media 800, as a grouping of data (packed data 830) to the unpacking device (see FIG. 27).

The license information 801 stored on the MO media 800 is the license information (AC) according any of the first to sixth embodiments. This license information 801 includes MSN and keys. The encrypted contents 802 is contents that is encrypted. A computer 820 is installed in the transmission side. OS 821 controls execution of various types of application programs. A file system 822 manages files handled by the computer 820 and controls read/write of data.

A packing section 823 generates a file (packed data 830) from the license information 801 and the encrypted contents 802. A transfer section 824 transfers the packed data 830 to the unpacking device (see FIG. 27). MO device 810 is provided to the computer 820 externally (or internally), and reads out the license information 801 and the encrypted contents 802 from MO media (MO media 800 in FIG. 26). This MO device 810 has a drive 811 to drive the MO media.

On the other hand, in FIG. 27, computer 920 is installed in the reception side. OS 921 controls execution of various types of application programs. A file system 922 manages files handled by the computer 920 and controls read/write of data. A reception section 924 receives the packed data 830 transferred from the packed data generating device (see FIG. 26). An unpacking section 923 generates two files (license information 801 and encrypted contents 802) from the packed data 830. MO device 910 is provided to the computer 920 externally (or internally), and writes the license information 801 and the encrypted contents 802 onto MO media (MO media 900 in FIG. 27). This MO device 910 has a drive 911 to drive the MO media.

Based on this configuration, when the license information 801 and the encrypted contents 802 are read out from the MO media 800 shown in FIG. 26, the packing section 823 generates a file (packed data 830) from these license information 801 and encrypted contents 802 and transfers the file to the transfer section 824. Accordingly, the transfer section 824 transfers the packed data 830 to the unpacking device shown in FIG. 27 via the cable or the network.

When the packed data 830 is received by the reception section 924 shown in FIG. 27, the unpacking section 923 generates the license information 801 and the encrypted contents 802 from the packed data 830. Thus, the license information 801 and the encrypted contents 802 are written onto the MO media 900. In this seventh embodiment, the license information 801 and the encrypted contents 802 can be transferred (copied) from the MO media 800 to the MO media 900 in the manner as explained above. Thus, the license regarding the playback of contents can easily be transferred.

As explained above, according to the seventh embodiment, the encrypted contents 802 and the license information 801 are transferred (copied) from the MO media 800 to the other MO media 900, thus, the license regarding the playback of the contents 801 can be transferred to a third party.

For example, in the first to the seventh embodiments, access to contents may be controlled by recording a contents access control program, that realizes functions of the contents access control apparatus and the access control system, on a computer-readable recording medium, and making the computer read and execute the contents access control program recorded on the recording medium. The recording medium includes not only any transportable type of recording medium such as an optical disk, a floppy disk, or a hard disk, but also any transport media such as a network that temporarily records and holds data.

As explained above, according to the present invention, license information and contents are correlated with each other and recorded on one media, and access to the contents is controlled based on the license information and the identifying information. Therefore, by acquiring the media, both of the license information and the contents can concurrently be obtained. Resultantly, the invention has such an advantageous effect that the contents can more easily be utilized as compared to the conventional case where the license information and the contents are separately acquired.

Further, a plurality of blocked license information are subjected to multiple encryption and recorded on media. Resultantly, the invention has such an advantageous effect that unauthorized access to contents can be prevented.

Further, in addition to the plurality of blocked license information, the contents decryption key to decrypt the contents is subjected to multiple encryption and recorded on the media. Resultantly, the invention has such an advantageous effect that unauthorized access to contents can more effectively be prevented.

Further, encrypted license information is recorded on the secured region of media. Resultantly, the invention has such an advantageous effect that unauthorized access to contents can be prevented.

Further, license information is recorded on the secured region of media, and only when two physical elements are mutually authenticated, the license information is acquired from the specific region. Therefore, the license can be disapproved at the instant at which it is determined that mutual authentication is not obtained. Resultantly, the invention has such an advantageous effect that unauthorized access to contents can be prevented.

Further, the secured region is mapped to the specific region, both of which are effective in security. Resultantly, the invention has such an advantageous effect that extremely high security can be ensured.

Further, the contents and the license information are transferred (copied) from one of media to the other media. Resultantly, the invention has such an advantageous effect that the license regarding access to contents can be transferred to a third party.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A contents access control apparatus which provides a control on an access to contents to be provided by an authenticated information provider to a user, said apparatus comprising:

a utilization unit which utilizes the contents stored in a recording medium which stores contents and license information, the utilization unit including a plurality of physical elements for reading out and decoding the contents and the recording medium, to which identifying information are respectively allocated, wherein the contents, and the identifying information of the physical elements for reading out and decoding the contents and the recording medium are recorded on the recording medium in correlation with each other, and a logical product of at least three identifying information is set in the license information; and an access control unit which controls access to the contents based on the identifying information allocated to physical elements for reading out and decoding the contents and the recording medium of said utilization unit and the license information regarding the access to the contents, wherein the license information is recorded on said recording medium.

2. The contents access control apparatus according to claim 1, wherein the license information is formed with a plurality of blocked license information corresponding to said physical elements, the plurality of blocked license information are subjected to multiple encryption based on a key associated with a respective identifying information corresponding to said physical elements and the plurality of blocked license information being subjected to the multiple encryption are recorded on said recording medium, and said access control unit controls access to the contents based on the respective identifying information corresponding to said plurality of physical elements and the results of decrypting the blocked license information using the respective identifying information corresponding to said plurality of physical elements.

3. The contents access control apparatus according to claim 2, wherein encrypted contents and a contents decryption key to decrypt the contents are also recorded on said recording medium, and when the access is allowed by said access control unit, said utilization unit utilizes the contents based on the result of decrypting the contents using the contents decryption key.

4. The contents access control apparatus according to claim 1, wherein said recording medium comprises a secured region where encrypted information is recorded, and the encrypted license information is recorded on this secured region, and said access control unit controls access to the contents based on the result of decrypting the license information recorded on the secured region and the identifying information.

5. The contents access control apparatus according to claim 1, wherein at least two of the physical elements perform mutual authentication when a mutual authentication command is issued, said has recording medium comprises a specific region to which access can be made only when the mutual authentication command is issued and the two physical elements are mutually authenticated, and the license information is stored on the specific region, and wherein said access control unit acquires the license information from the specific region only when the mutual authentication command is issued and the two physical elements are mutually authenticated, and controls access to the contents based on the license information and the identifying information.

6. The contents access control apparatus according to claim 5, wherein said recording medium comprises a secured region where encrypted information is recorded, and the specific region is mapped with the secured region.

7. A computer-readable recording medium storing a contents access control program, that is applied to a contents access control apparatus comprising a utilization unit which utilizes contents stored in a recording medium which stores contents and license information, and includes a plurality of physical elements for reading out and decoding the contents and the recording medium, to which identifying information for identifying the physical elements are respectively allocated, the recording medium having the contents to be provided from an authenticated information provider to a user recorded on the recording medium, wherein a logical product of at least three identifying information is set in the license information, the license information related to the contents is recorded on said recording medium in correlation with the identifying information for identifying the physical elements for reading out and decoding the contents and the recording medium, and the contents access control program makes a computer execute access control steps of controlling access to the contents based on the identifying information allocated for reading out and decoding the contents and the recording medium of said utilization unit and the license information regarding the access to the contents by performing mutual authentication of at least two physical elements and allowing access to the contents when the at least two physical elements are mutually authenticated and disapproving the license when the at least two physical elements are not mutually authenticated.

8. A contents access control apparatus which controls access to contents provided by an authenticated information provider to a user, the apparatus comprising:

a plurality of physical elements which read out and decode the contents;

a recording medium including the contents and identifying information of the physical elements and the recording medium which are mutually correlated by file management data; and an access control unit which controls access to the contents based on the identifying information and a license information regarding the contents, wherein a logical product of at least three identifying information is set in the license information, and the license information regarding the contents is recorded on the recording medium.

9. A contents access control method for controlling access to contents provided by an authenticated information provider to a user, the method comprising:

reading out and decoding the contents by at least one physical element;

correlating identifying information of the physical element and identifying information of a recording medium in file management data;

storing the contents, the identifying information of the physical element and the identifying information of the recording medium on the recording medium;

storing license information regarding the contents on the recording medium; and controlling access to the contents based on the identifying information of the physical element, the identifying information of the recording medium and the license information being in correlation with each other, wherein a logical product of at least three identifying information is set in the license information.

* * * * *

UNITED STATES PATENT AND TRADEMARK OFFICE
CERTIFICATE OF CORRECTION

| | |
|---|---|
| PATENT NO. | : 7,028,340 B1 |
| APPLICATION NO. | : 09/628562 |
| DATED | : April 11, 2006 |
| INVENTOR(S) | : Jun Kamada et al. |

Page 1 of 1

It is certified that error appears in the above-identified patent and that said Letters Patent is hereby corrected as shown below:

On the Title Page, item (56) References Cited, Other Publications, line 1, change "et al," to -- et al.,--

Column 23, line 41, after "said" delete "has"

Signed and Sealed this

Fourth Day of March, 2008

JON W. DUDAS
*Director of the United States Patent and Trademark Office*